United States Patent
Paulsen et al.

(10) Patent No.: US 8,785,042 B2
(45) Date of Patent: Jul. 22, 2014

(54) ISLAND-COVERED LITHIUM COBALTITE OXIDES

(75) Inventors: Jens Martin Paulsen, Fort Saskatchewan (CA); Thomas Lau, Edmonton (CA)

(73) Assignee: Umicore, Brussels (BE)

( * ) Notice: Subject to any disclaimer, the term of this patent is extended or adjusted under 35 U.S.C. 154(b) by 826 days.

(21) Appl. No.: 12/374,532

(22) PCT Filed: Jan. 17, 2008

(86) PCT No.: PCT/EP2008/000313
§ 371 (c)(1), (2), (4) Date: Jan. 21, 2009

(87) PCT Pub. No.: WO2008/092568
PCT Pub. Date: Aug. 7, 2008

(65) Prior Publication Data
US 2009/0309063 A1    Dec. 17, 2009

Related U.S. Application Data

(60) Provisional application No. 60/897,823, filed on Jan. 29, 2007, provisional application No. 60/929,613, filed on Jul. 5, 2007.

(30) Foreign Application Priority Data

Jun. 29, 2007    (EP) .................................. 07012789

(51) Int. Cl.
    *H01M 4/13*    (2010.01)
(52) U.S. Cl.
    USPC .................................................. 429/218.1

(58) Field of Classification Search
    USPC .................................................. 429/218.1
    See application file for complete search history.

(56) References Cited

U.S. PATENT DOCUMENTS

| 6,040,090 A | 3/2000 | Sunagawa et al. |
| 7,078,128 B2 | 7/2006 | Lu et al. |
| 7,608,332 B2 * | 10/2009 | Liu et al. ..................... 428/403 |
| 7,981,544 B2 * | 7/2011 | Morishima ................... 429/223 |

(Continued)

FOREIGN PATENT DOCUMENTS

| EP | 1189296 | 3/2002 |
| WO | 2004/040677 | 5/2004 |

(Continued)

OTHER PUBLICATIONS

Paulsen et al., "Core-Shell Cathode Material with Size-Dependent Composition," Electrochemical and Solid-State Letters, vol. 10, No. 4, (2007), pp. A101-A105.

*Primary Examiner* — Patrick Ryan
*Assistant Examiner* — Lucas J O Donnell
(74) *Attorney, Agent, or Firm* — Brinks Gilson & Lione

(57) ABSTRACT

Disclosed is a cathode active material and a method to produce the same at low cost. The cathode powder comprises modified $LiCoO_2$, and possibly a second phase which is $LiM'O_2$ where M' is Mn, Ni, Co with a stoichiometric ratio Ni:Mn≥1. The modified $LiCoO_2$ is Ni and Mn bearing and has regions of low and high manganese content, where regions with high manganese content are located in islands on the surface. The cathode material has high cycling stability, a very high rate performance and good high temperature storage properties.

23 Claims, 18 Drawing Sheets

(56) References Cited

U.S. PATENT DOCUMENTS

Figure 1:
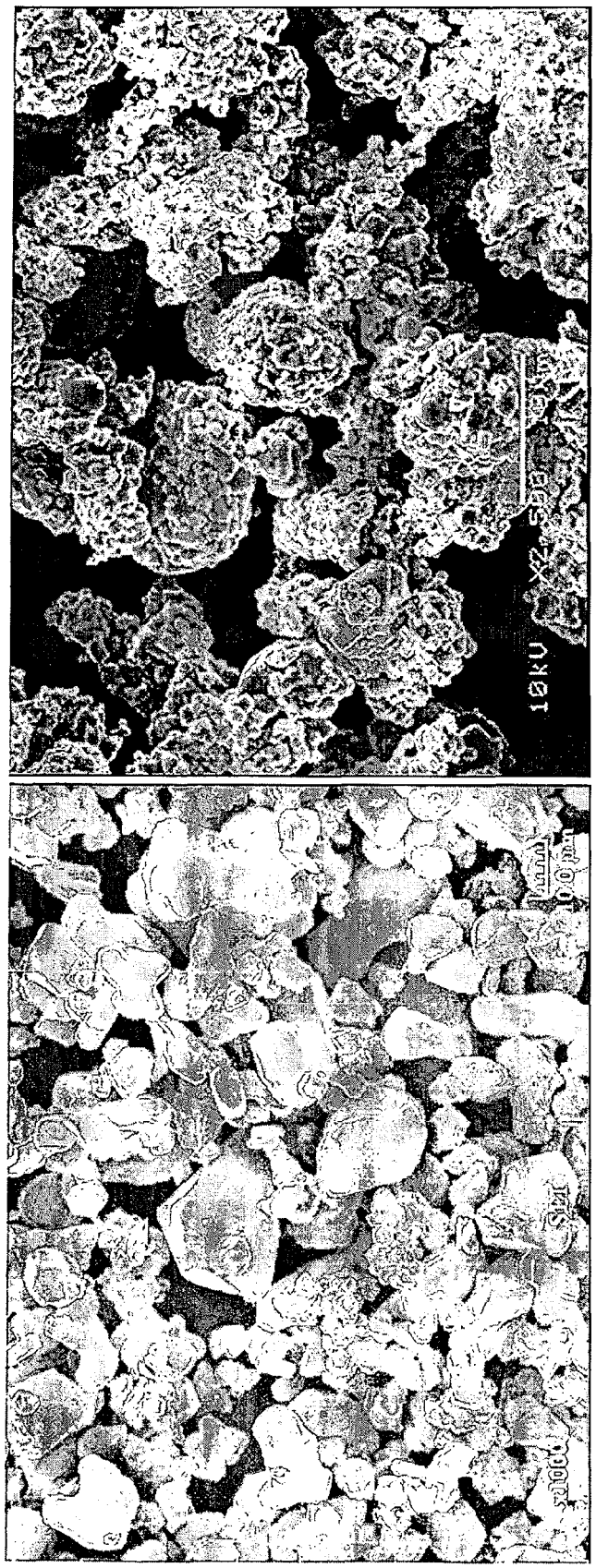

| | | |
|---|---|---|
| 8,101,296 B2 * | 1/2012 | Murakami et al. ............ 429/188 |
| 2004/0126660 A1 * | 7/2004 | Ohzuku et al. ................ 429/223 |
| 2006/0257745 A1 | 11/2006 | Choi et al. |
| 2007/0122705 A1 * | 5/2007 | Paulsen et al. ............. 429/231.3 |
| 2007/0212608 A1 * | 9/2007 | Liu et al. .................... 429/231.1 |

FOREIGN PATENT DOCUMENTS

| | | |
|---|---|---|
| WO | 2005/056480 | 6/2005 |
| WO | 2005/064715 | 7/2005 |
| WO | WO 2005064715 A1 * | 7/2005 |

* cited by examiner

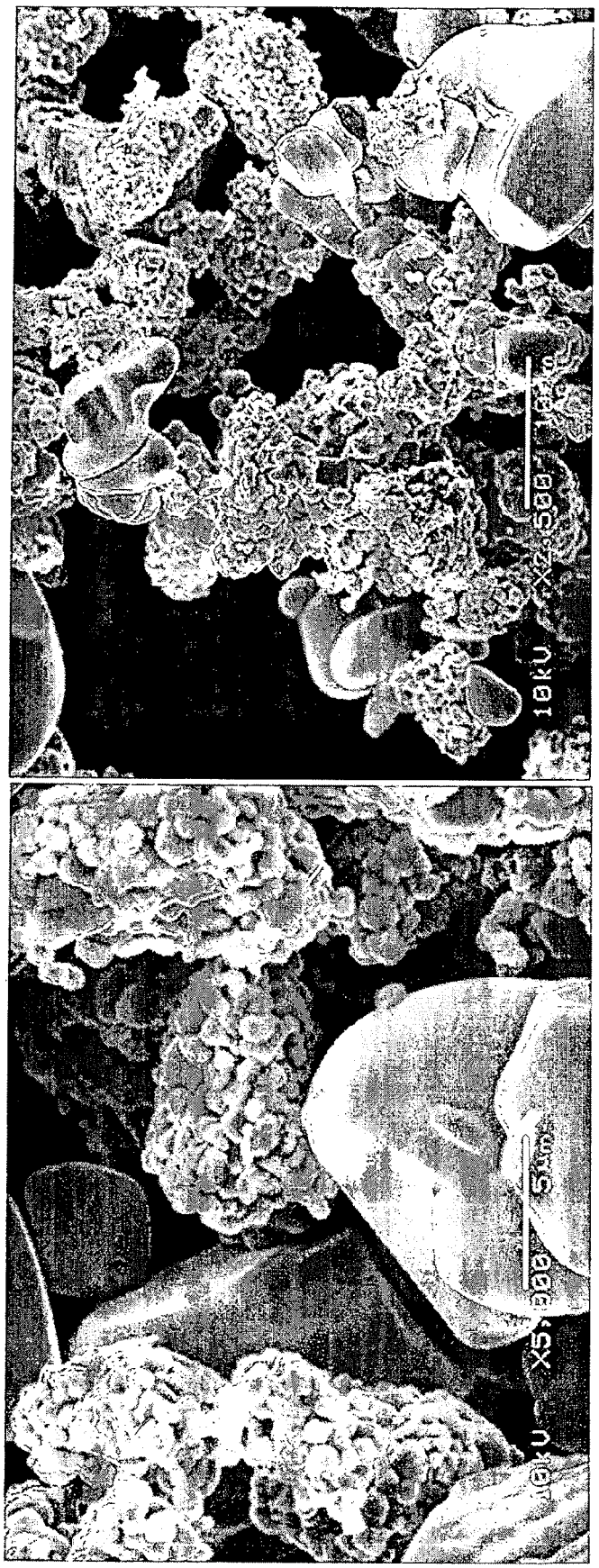

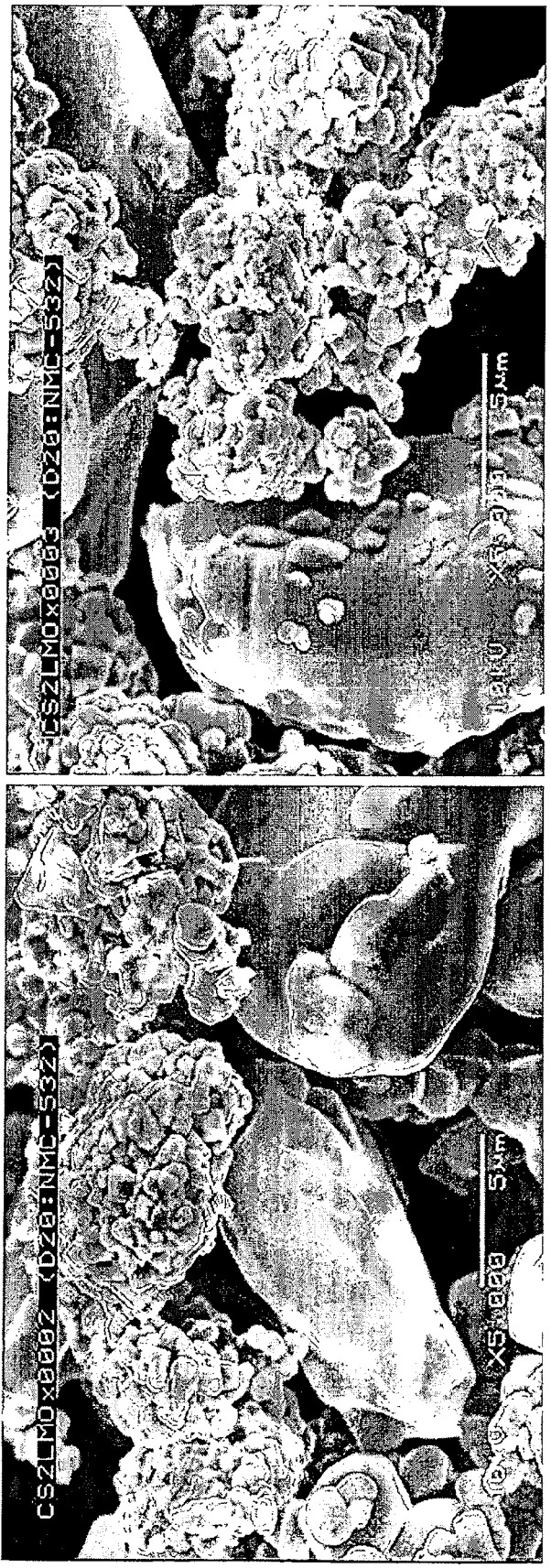

Fig. 16
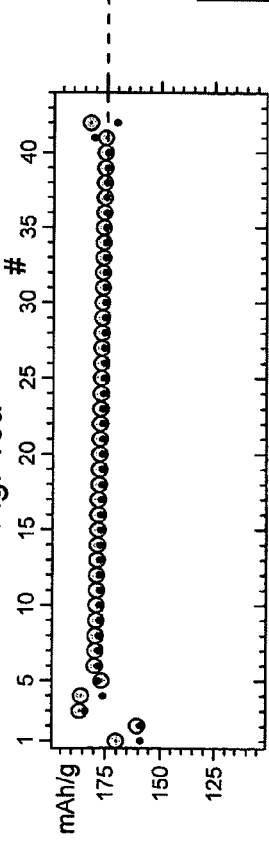
Fig. 16a
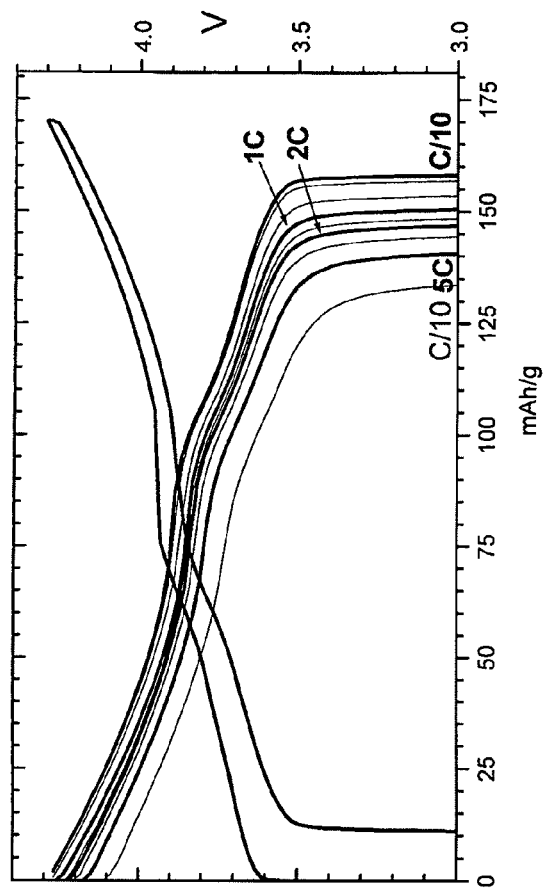
Fig. 16c
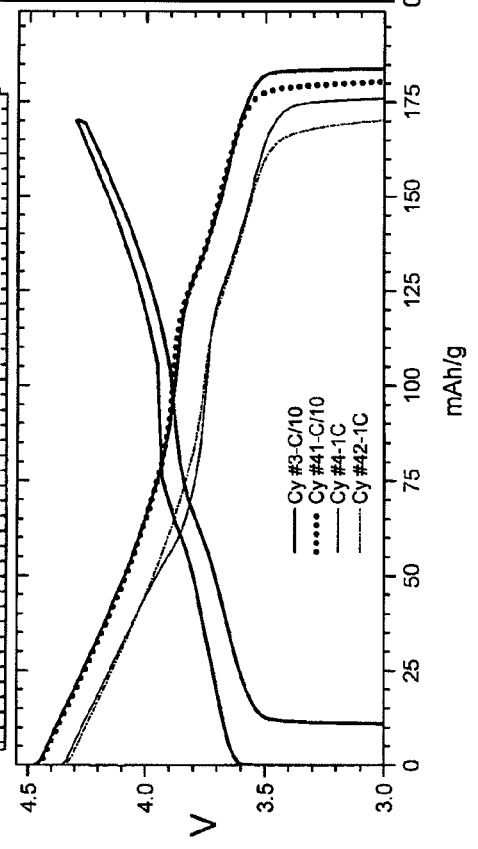
Fig. 16b

ISLAND-COVERED LITHIUM COBALTITE OXIDES

This application is a National Stage application of International Application No. PCT/EP2008/000313, filed Jan. 17, 2008, which claims priority to U.S. Provisional 60/897,823, filed Jan. 29, 2007, European Patent Application No. 07012789.9, filed Jun. 29, 2007, and U.S. Provisional Patent Application No. 60/929,613, filed Jul. 5, 2007, the entire contents of which are hereby incorporated by reference.

The present invention relates to a powderous lithium transition metal oxide, containing a special type of Mn and Ni bearing $LiCoO_2$. The cathode powder can be prepared at large scale by a low-cost process. More specifically, the preparation is the sintering of a mixture of a cobalt containing precursor, like $LiCoO_2$, a Ni—Mn—Co containing precursor, like mixed hydroxide MOOH, and $Li_2CO_3$. The sintering temperature is high enough to allow for an exchange of cations between the $LiCoO_2$ and Li—Ni—Mn—Co oxide phases being formed, which results in a very specific morphology with a compositional gradient of the different transition metals. The lithium transition metal oxide powder can be used as a cathode active material in rechargeable lithium batteries.

Despite of some inherent limitations like poor safety and high cost $LiCoO_2$ still is the most applied cathode material for rechargeable lithium batteries. There is a strong demand driven by customer expectation to increase the energy density of rechargeable lithium batteries. One way to improve the energy density is to increase the charge voltage, which requires more robust cathode materials which can be charged at higher voltage. Problems which appear or become more severe if the charging voltage is increased are (a) low safety, (b) poor storage properties during storage of charged batteries at elevated temperature and (c) poor cycling stability. Numerous approaches have been disclosed to address these problems. Partial improvements have been achieved but the basic problems have not been fully resolved.

Beside the demand to increase the energy density, it is essential that rechargeable batteries meet the power requirements. That means that the battery as a whole and particularly the active cathode material itself has a sufficient high rate performance.

There exist general trends. Careful studying of published results on cathode materials allows to better understand the limitations of $LiCoO_2$ based rechargeable lithium batteries.

One basic limitation originates from the surface area dilemma. Increase rate performance (i.e. high power) can be met by increasing the surface area because the solid-state lithium diffusion length can be decreased; which results in an improved rate performance. However, a high surface area increases the area where unwanted side reactions between electrolyte and charged cathode take place. These side reactions are the course of poor safety, poor cycling stability at elevated voltage and of poor storage properties of charged cathode at elevated temperature. Furthermore, high surface area materials tends to have a low packing density which reduces the volumetric energy density.

Another basic limitation originates from the cobalt stoichiometry. Lithium-nickel-manganese-cobalt oxide based cathode materials (like $LiMn_{1/3}Ni_{1/3}Co_{1/3}O_2$) have higher stability against reactions between electrolyte and cathode than $LiCoO_2$, and the raw material cost is lower, but these materials suffer from a lower volumetric energy density and these materials typically have a lower lithium diffusion constant.

It can be concluded that there exist basic limitations in:
Surface area: Low surface area cathode materials are desired to achieve high safety, improved density and high stability during storage; however, the surface area cannot be lowered too much because this will lower the rate performance.

Composition: $LiMO_2$ cathodes, where M dominantly is cobalt is desired to achieve high lithium diffusion rate and high volumetric energy density; however a high content of cobalt causes poor safety properties, increased cost and an inferior high voltage stability.

A solution to this dilemma would be to increase the diffusion constant. Increased D would allow to lower the surface area without loosing rate performance.

$LiMO_2$, where M=Ni—Mn—Co with Ni:Mn>1, has been previously disclosed. U.S. Pat. No. 6,040,090 (Sanyo), for example, discloses a wide range of compositions $LiMO_2$ (M=Mn, Ni, Co) including $LiMO_2$ with Ni:Mn>1. The patent application discloses that $LiMO_2$ has a high degree of crystallinity (small HWFM of peaks in the X-ray diffraction pattern). $LiCoO_2$ doped with Ni and Mn has for example been disclosed in U.S. Pat. No. 7,078,128. U.S. Pat. No. 7,078,128 discloses $LiCoO_2$, doped by equal amounts of Ni and Mn is a preferred implementation.

European patent application EP1716609 A1 discloses a $LiMO_2$ based active cathode material where the composition of the particles depends on the size of the particles, particularly, the cobalt content of particles decreases with decreasing size of the particles. The decrease of cobalt content originates from a core-shell structured particles, where the Mn—Ni containing shell has the same thickness, covering a $LiCoO_2$ core. As a result, if the particles are small, the $LiCoO_2$ core is small and the cobalt content of the whole particle is low.

European patent application EP1556915 A1 discloses a $LiMO_2$ with a gradient of transition metal composition. The gradient originates from a mixed hydroxide shell, covering the core which has significantly different metal composition. In a preferred implementation the core is $LiCoO_2$. After sintering a gradient of transition metal composition with a radial change of stoichiometry is achieved, and a $LiMO_2$ shell covers a $LiCoO_2$ based core. During sintering, cobalt diffuses from the $LiCoO_2$ core to the $LiMO_2$ shell. At the same time much less Ni diffuses from the $LiMO_2$ shell into the $LiCoO_2$ core. Therefore the shell swells and the $LiCoO_2$ core contracts. A swelling shell covering a shrinking core typically causes the creation of voids between shell and core. These voids are highly undesired.

It is an object of the present invention to define a cathode material having a high rate performance, and showing high stability during extended cycling at high charge voltage. The high temperature storage properties are also improved. This is achieved by a powderous lithium transition metal oxide comprising Mn and Ni bearing $LiCoO_2$ particles, said particles having Mn and Ni enriched islands on their surface, said islands comprising at least 5 mol %, and preferably at least 10 mol % of Mn.

The Mn and Ni enriched islands preferably have a thickness of at least 100 nm and cover less than 70%, and preferably less than 50% of the surface of said Mn and Ni bearing $LiCoO_2$ particles. Also, the Mn concentration in said islands is preferably at least 4 mol %, and preferably at least 7 mol % higher than the Mn concentration in the bulk of said Mn and Ni bearing $LiCoO_2$ particles.

In a further embodiment the Ni concentration in said Mn and Ni enriched islands is at least 2 mol %, and preferably at least 6 mol % higher than the Ni concentration in the bulk of said Mn and Ni bearing $LiCoO_2$ particles. Preferably the Mn and Ni bearing $LiCoO_2$ particles comprise at least 3 mol %, and more preferably at least 10 mol % of both Ni and Mn. In one preferential embodiment the crystallographic lattice constants a and c of said Mn and Ni bearing LiCoO$_2$ particles are respectively 2.815+/−0.002 and 14.05+/−0.01.

Also, it is preferred that the Mn and Ni bearing LiCoO$_2$ particles are monolithic and free of inner porosities. Preferably also, the size distribution of said Mn and Ni bearing LiCoO$_2$ particles has a d50 larger than 10, preferably larger than 15, and most preferably larger than 20 µm.

In a further preferred embodiment, the powderous lithium transition metal oxide comprises between 30 wt. % and 95 wt. % of said Mn and Ni bearing LiCoO$_2$ particles.

The invention also covers a lithium transition metal oxide having a first phase consisting of said Mn and Ni bearing LiCoO$_2$ particles, and further comprising a second island-free phase having a generalized formula of Li$_{1+a}$M'$_{1-a}$O$_{2\pm b}$, with −0.03<a<0.05 and b<0.02, M'=Ni$_m$Mn$_n$Co$_{1-m-n}$, with m≥n, and 0.1<m+n≤0.9. The powderous lithium transition metal oxide then preferably has a total composition of Li$_x$M$_y$O$_{2\pm\delta}$ with 0.97<x<1.03, 0.97<y<1.03, x+y=2 and δ<0.05, and M=Co$_{1-f-g}$Ni$_f$Mn$_g$, with 0.05<f+g<0.5 and f≥g. It is also preferred that 0.98<x/y<1.00. In another preferred embodiment, said oxide consists of only two phases, the first being said Mn and Ni bearing LiCoO$_2$ particles, and the second being said island-free phase.

It is also preferred that the crystallographic lattice constants a' and c' of said island-free phase have the following relationship with the lattice constants a" and c" of a corresponding island-free phase of a reference lithium transition metal (M$_{ref}$) oxide, having the same composition Li$_x$M$_y$O$_{2\pm\delta}$ and consisting of pure LiCoO$_2$ particles and said corresponding island-free phase:

0.980<a'/a"<0.998 and 0.9860<c'/c"<0.9985, and preferably 0.990<a'/a"<0.997 and 0.9920<c'/c"<0.9980.

If for example, the material of the actual invention, LiMO$_2$ has been prepared from a Co precursor and from a mixed metal hydroxide of composition M"=Ni$_m$Mn$_n$Co$_{1-m-n}$, then the lattice constants a" and c" refer to a reference material with composition LiM"O$_2$, the different lattice constant a' and c' manifest that sufficient exchange of cations between the LiCoO$_2$ based first phase, and the island-free second phase has taken place.

The island-free phase preferably has secondary particles with a size distribution with a d50 between 2 and 10 micrometer, said secondary particles consisting of sintered agglomerates of primary crystallites having a particle size distribution with a d50 between 0.5 and 2 µm. In a further preferred embodiment both said Mn and Ni enriched islands and said island-free phases further comprise Ti, whereby the Ti content is less than 10 mol % of M in the oxide Li$_x$M$_y$O$_{2\pm\delta}$.

More preferred, the powderous lithium transition metal oxide further comprises less than 5 mol % of M of one or more dopants selected from the group consisting of Al and Mg, and less than 1 mol % of M of one or more dopants selected from the group consisting of Be, B, Ca, Zr, S, F, and P; in the oxide Li$_x$M$_y$O$_{2\pm\delta}$.

For the sake of simplicity, in the description, the Mn and Ni bearing LiCoO$_2$ particles will mostly be referred to as 'phase 1' or also as the 'modified LiCoO$_2$ phase', and the island-free phase having a generalized formula of Li$_{1+a}$M'$_{1-a}$O$_{2\pm b}$ will be referred to as the LiM'O$_2$' (M'=Ni—Mn—Co) phase or 'phase 2' of the lithium transition metal oxide, which is also referred to as the 'cathode material'.

The actual invention discloses that, surprisingly, the rate performance of mixtures of LiCoO$_2$ (phase 1) and LiM'O$_2$ (M'=Ni—Mn—Co) with Ni:Mn ratio of >1 (phase 2) is dramatically improved if these mixtures have been heat treated with each other (co-sintering) in a way which causes an exchange of cations between LiCoO$_2$ and LiM'O$_2$ during sintering, causing a distribution of composition of the particles of phase 1 and of phase 2. At the same time a special morphology of the phase 1 particles (LiCoO$_2$) is obtained. The particles are partially covered by manganese containing LiM'O$_2$ sheets. The authors refer to this morphology as "island" morphology. At the same time, surprisingly, the stability at high voltage is dramatically improved as well.

The modified LiCoO's morphology, has islands densely sintered to the bulk of the modified LiCoO$_2$, causing local gradients of transition metal stoichiometry. The islands contain manganese in high concentration. Both the LiCoO$_2$, as well as the LiM'O$_2$ particles have a distribution of composition. Additionally, the LiM'O$_2$ particles have a morphology depending on the cobalt content. The size of primary crystallites increases with cobalt content. Contrary to EP1556915 A1 mentioned above, in the invention there is no radial change of stoichiometry. It is rather a multi-center gradient with the LiM'O$_2$ islands, located on the surface and acting as centers of the gradient. Also, the only partial coverage of the LiCoO$_2$ by islands is a very important difference.

Another important aspect of the invention is that the islands not completely cover the LiCoO$_2$ particles. A complete coverage—with other words—a LiCoO$_2$ core—LiM'O$_2$ shell morphology can be achieved by precipitating mixed hydroxide onto the surface of the LiCoO$_2$. This approach has been described in above mentioned patent applications EP1556915 A1 and EP1716609 A1 (Paulsen et al.). The case of the MOOH shell—LiCoO$_2$ core precursor has two major draw-backs, as described in Core-Shell Cathode Material with Size-Dependent Composition, Jens M. Paulsen, Jong-Seok Jeong, and Ki-Young Lee, Electrochem. Solid-State Lett., Volume 10, Issue 4, pp. A101-A105 (2007). (1) the process is more expensive and (2) during sintering more cobalt diffuses from the core into the shell. Thus the shell expands and the core shrinks at the same time. This typically causes a partial separation of the shell from the core, causing large cavities. These large cavities are very undesirable because (i) they increase the porosity of the electrode—thus causing a lower energy density and (ii) they hinder the direct diffusion of lithium across the cavity into or out of the core region of the LiCoO$_2$ particle—thus causing loss of rate performance.

The situation is different for the cathode materials of the actual invention. The manganese containing islands cover only a fraction of the surface of the LiCoO$_2$ particle. Therefore the cobalt diffusion induced swelling of the islands and shrinking of the LiCoO$_2$ core does not cause the creation of large cavities. As a result a high volumetric density and a high rate performance can be achieved.

The invention also covers an electrochemical cell comprising a cathode comprising as active material the powderous lithium transition metal oxide described before.

A method for preparing the powderous lithium transition metal oxide described before comprises the steps of:

providing a mixture of LiCoO$_2$ powder or a cobalt containing precursor compound having a cobalt content of at least 90 mol %, and a Li—Ni—Mn—Co-oxide or a Ni—Mn—Co precursor powder and optionally a Li-precursor compound, preferably lithium carbonate, and sintering said mixture at a temperature T of at least 900° C., and preferably at least 950° C., for a time t between 1 and 48 hrs, so as to obtain Mn and Ni bearing LiCoO$_2$ particles having Mn and Ni enriched islands on their surface.

The cathode material is thus prepared by sintering a mixture of a LiCoO$_2$ based powder with a Li—Ni—Mn—Co-oxide or a Ni—Mn—Co containing powder and a source of lithium like $Li_2CO_3$ at high temperature, exceeding 900° C. The temperature must be over 900° C., for example 910° C. or 920° C. During the sintering a partial exchange of cations between $LiCoO_2$ particles and the Ni—Mn containing particles takes place. It the sintering temperature is low, then not enough cations are exchanged and the cathode does not show high rate performance. If the sintering temperature is high, then the particles become too dense, and the metal composition equilibrates too much, i.e. to too much exchange of cations between $LiCoO_2$ and Mn—Ni—Co takes place. In that case, there will be no Mn and Ni enriched islands on the first phase particles.

Alternatively, a cobalt containing precursor powder (like cobalt oxide, cobalt hydroxide or cobalt carbonate) can be mixed with a Ni—Mn—Co containing powder and a source of lithium, followed by sintering at high temperature, preferably exceeding 950° C.

A method for preparing a powderous lithium transition metal oxide having the two phases described above, comprises the steps of:
  providing a mixture of $LiCoO_2$ powder or a cobalt containing precursor compound having a cobalt content of at least 90 mol %, and a Li—Ni—Mn—Co-oxide or a Ni—Mn—Co precursor powder and optionally a Li-precursor compound, preferably lithium carbonate, and sintering said mixture at a temperature T of at least 900° C., and preferably at least 950° C., for a time t between 1 and 48 hrs,
so as to obtain said Mn and Ni bearing $LiCoO_2$ particles phase and said island-free phase having crystallographic lattice constants a' and c', which have the following relationship with the lattice constants a" and c" of said Li—Ni—Mn—Co-oxide or a reference lithium transition metal ($M_{ref}$) oxide obtained by sintering said Ni—Mn—Co precursor powder and said Li-precursor compound at the same temperature T and for the same time t, said relationship being $$0.980 < a'/a" < 0.998 \text{ and } 0.9860 < c'/c" < 0.9985,$$

and preferably $0.990 < a'/a" < 0.997$ and $0.9920 < c'/c" < 0.9980$.

In these methods, the Ni—Mn—Co precursor powder preferably is a transition metal hydroxide, oxyhydroxide, carbonate, oxycarbonate, or lithium transition metal compound, in which the transition metal composition M" is $M"=Ni_oMn_pCo_{1-o-p}$, with $o+p>0.5$ and $o>p$. Also, the Ni—Mn—Co precursor powder preferably comprises between 5 and 70 mol % of the transition metal content of said powderous lithium transition metal oxide. In one embodiment, the used $LiCoO_2$ powder has a tap density of at least 2 g/cm$^3$, and consists of monolithic particles with a d50 of at least 10, preferably at least 15, and most preferably at least 20 μm.

On the other hand, the cobalt containing precursor compound preferably is either one of more of cobalt hydroxide, oxyhydroxide or carbonate.

In another embodiment, said $LiCoO_2$ or cobalt containing precursor comprises at least 80% of the transition metal of said powderous lithium transition metal oxide, and the Ni—Mn—Co comprising precursor powder consists of particles having a particle size distribution with a d50 between 1 and 3 μm.

In yet another embodiment, said $LiCoO_2$ or cobalt containing precursor comprises less than 80% of the transition metal of said powderous lithium transition metal oxide, and the Ni—Mn—Co comprising precursor consists of particles of the agglomerated type having a particle size distribution with a d50 between 4 and 10 μm.

In both of these embodiments, the Ni—Mn—Co comprising precursor can furthermore comprise Ti, preferably in the form of $TiO_2$ particles with a d50 less than 100 nm.

Details of the invention are now further discussed below.

The cathode material of the actual invention is a powder, containing modified $LiCoO_2$ and mostly, but not exclusively, a second transition metal phase. Both phases are lithium-transition-metal oxide phases with a layered crystal structure: ordered rocksalt type crystal structure—space group r-3m. The cathodes can be stoichiometry $Li_1M_1O_2$, with M being cobalt, manganese and/or nickel, or slightly lithium deficient ($Li_{1-x}M_{1+x}O_2$) or lithium rich $Li_{1+x}M_{1-x}O_2$, with x<0.3. The existence of oxygen non-stoichiometry is generally doubted. So the oxygen stoichiometry is aprox. 2.0, but it can not be excluded that the cathodes are slightly oxygen deficient or rich in oxygen. Thus the total composition is $Li_xM_yO_{2\pm\delta}$ with $0.97<x<1.03$, $0.97<y<1.03$, $x+y=2$ and $\delta<0.05$. M consists of manganese, cobalt and nickel, $M=Co_{1-f-g}Ni_fMn_g$ with the conditions that $0.05<f+g<0.5$ and $f \geq g$.

The first phase originates from the $LiCoO_2$ precursor and is a modified $LiCoO_2$. The composition can be defined as $LiCo_{1-a-b}Ni_aMn_bO_2$ with $a \geq b$, $0.03<a+b<0.5$ and preferably $0.1<a+b<0.5$. The formula is idealized and does not take account of small possible deviations like lithium excess or deficiency, oxygen non-stoichiometry or doping as described above. Preferable the $LiCoO_2$ based particles are monolithic. A monolithic particle does not exhibit inner porosity, and it does not consist of agglomerates of smaller primary particles. One aspect of the invention is that different particles of the $LiCoO_2$ phase have not exactly the same composition. The actual composition of a particle depends on how much nickel and manganese has diffused into the $LiCoO_2$ particle during sintering. The Ni and Mn originate from the precursor of the second phase which typically is a mixed hydroxide. The amount of Mn and Ni which diffuses into the $LiCoO_2$ based phase during sintering, besides many other factors like temperature, Li:M ratio, etc., strongly depends on the arrangement of neighboring Ni—Mn based particles and the contact area and contact pressure. As a result, different $LiCoO_2$ particles have a different composition.

A second, very important aspect of the invention is that the metal composition of single $LiCoO_2$ based particles is not homogeneous. Typical particles have an island like surface morphology, the islands originating from smaller Ni—Mn based particles or crystallites, densely sintered to the surface of the $LiCoO_2$ particle. The islands have a higher concentration of manganese than the areas further apart from the island, or the regions in the inside of the particle. The existence of the island morphology is an inherent feature of the cathode material of the actual invention. These islands—being centers with higher manganese content—cannot be separated from the particle. They are densely and continuously connected with the bulk of the $LiCoO_2$ particle. Hence the manganese stoichiometry—with increasing distance from the island—decreases, possibly in a gradient-like manner and approaches zero in the inside of the particles or on the surface in-between distant islands. The inventors observed that the island morphology is related to the high observed rate performance of the disclosed cathode materials. The authors speculate that the islands—if they were not connected to the $LiCoO_2$ particles—would have different crystal lattice constants. However, the island is densely connected to the $LiCoO_2$, and between $LiCoO_2$ particle and island a region of manganese stoichiometry gradient exists. Therefore the island as well as the particles will undergo strong lattice strain. The strain somehow—the exact mechanism is unknown to the authors—enables a significantly faster diffusion of lithium into the particle.

A second phase is LiM'O$_2$ with M'=Ni$_m$Mn$_n$Co$_{1-m-n}$, m≥n, 0.1<m+n≤0.9 The formula is idealized and does not take account of small possible deviations as lithium excess or deficiency, oxygen non-stoichiometry or doping as described above. The second phase preferably originates from a Ni—Mn—Co containing precursor like mixed hydroxide, mixed oxihydroxide, mixed oxide, mixed lithium metal oxide or mixed carbonate. During the sintering the metal composition of the second phase changes. Cobalt diffuses from the LiCoO$_2$ particles into the LiM'O$_2$ particles. Some Ni and Mn diffuses out of the LiM'O$_2$ particles into the LiCoO$_2$ particles. As a result, the cobalt stoichiometry of the second phase is higher than the cobalt stoichiometry of the Ni—Mn—Co containing precursor. The change of cobalt stoichiometry is an important aspect of the invention. Only if the cobalt stoichiometry increases significantly during sintering, enough exchange of cations has taken place and only in this case the rate performance of the resulting cathode is sufficiently improved.

The inventors have made two more surprising observations, which are believed to be further essential aspects of the invention:

First observation: The fraction of second phase increases during sintering. Apparently, more cobalt diffuses into the second phase (LiM'O$_2$) than nickel and manganese diffuses into the LiCoO$_2$ phase. The inventors speculate that this difference in diffusion enhances the observed island morphology. Related to this observation is a clear change of voltage profile. A mixture of LiCoO$_2$ and LiM'O$_2$ has a characteristic voltage profile with a plateau at 3.88 V. With increased cation exchange the authors observed a disappearing of the 3.88 V plateau together with a lowering of the end-of discharge voltage. Furthermore, cobalt does not only diffuse into the LiM'O$_2$ particles but also into the manganese containing regions on the surface; during this process the areas between the island act as Co source. At the same time the island itself is a cobalt sink. In a simple picture—the manganese containing island swells with cobalt like a sponge would swell by removing water from its surrounding. This process explains why the islands morphology is created.

Second observation: The first phase has a composition which clearly differs from pure LiCoO$_2$. A large fraction of particles of the first phase contains at least 3 percent, more preferably 10% of manganese and nickel. Such a change of stoichiometry is usually accompanied by a significant change of lattice constants. However, X-ray diffraction analysis surprisingly shows that the lattice constants of the first phase (obtained from a two-phase Rietveld refinement) basically have not changed—they remain identically to those of LiCoO$_2$. The inventors believe that this is a very important aspect of the invention which shows that the improvement of rate performance of the first phase is not caused by the creation of a solid state solution between LiCoO$_2$ and LiM'O$_2$. (A solid state solution shows a gradual change of lattice constants depending on the composition.)

A further aspect of the invention is that the LiM'O$_2$ particles (second phase) have crystallites, the size of the crystallites correlates with the cobalt content. Apparently, during sintering, as more Ni (and Mn) diffused away from the LiM'O$_2$ into the LiCoO$_2$ particles, and as more Co diffuses into the LiM'O$_2$ particles, an acceleration of crystallite growth is caused. As a result, LiM'O$_2$ particles (second phase) with higher cobalt stoichiometry have larger primary crystallites. This is a very useful process because in a self-organized manner, an optimized morphology is achieved. This is because an increased content of cobalt causes a faster lithium diffusion, which allows for larger crystallites without losing rate performance. The correlation between high cobalt content and larger size however only refers to the size of crystallites, not to the size of particles. It is likely that large particles in average have a lower cobalt stoichiometry than small particles, because more cobalt has to diffuse a longer pathway.

The inventors understand the reactions which cause the island morphology as follows: during sintering, a significant fraction of the smaller and agglomerated LiM'O$_2$ particles is in contact with the LiCoO$_2$ particles. The contact points are the cobalt sinks, and manganese containing islands, inherently embedded on the surface of the LiCoO$_2$ particle are formed. At the same time, nickel (and some manganese) diffuses into the LiCoO$_2$ and cobalt diffuses into the LiM'O$_2$ particle. During sintering the density of the agglomerated LiM'O$_2$ particles, caused by the up-take of cobalt and due to thermal sintering increases. During the densification the contact between the swelling island and the LiM'O$_2$ particle is lost and the final cathode, consisting of particles of two different phases is achieved.

The loss of contact between LiM'O$_2$ and LiCoO$_2$ is easier if the LiM'O$_2$ particle is agglomerated. In this case only a part of the LiM'O$_2$ particle is consumed and forms the seed for the island. Alternatively, no loss of contact is required if the Ni—Mn—Co precursor has very small particles with a d50 of less than 1-2 micrometer. In this case, a large fraction or even the totality of the Ni—Mn—Co particles is consumed to form the seed of the island. As a consequence, different implementations of the actual invention are possible.

First typical implementation: it is particularly preferred that the Ni—Mn—Co precursor consists of agglomerated crystallites. A preferred example is a mixed hydroxide, where secondary particles consist of not too dense agglomerates of primary particles. Very dense and large Ni—Mn—Co precursors are less suitable. A preferred particle size distribution has a d50 of 4-8 micrometer. In this case LiM'O$_2$ particles are small enough to (a) support a very high rate and (b) they fit nicely in-between the voids of the larger LiCoO$_2$ particles which allows for low porosity electrodes and a high volumetric energy density.

Preferably, the precursor for the first phase (LiCoO$_2$) is monolithic, dense and has much larger size than the precursor for the second phase (LiM'O$_2$) which is agglomerated, less dense and has smaller size. A preferred precursor for the first phase is LiCoO$_2$ with dense monolithic particles of at least 10-20 micrometer. Many commercial LiCoO$_2$ materials have this desired morphology. Alternatively, cobalt hydroxide, cobalt oxyhydroxide, cobalt oxide or cobalt carbonate is a suitable precursor if it has large particles (at least 10-20 micrometer) and high density. As an example—cobalt hydroxide or oxyhydroxide with roughly spherical particles and a tap density above 2.0 g/cm$^3$ and a d50 of the particle size distribution larger than 15-20 micrometer is a suitable precursor.

If the Ni—Mn—Co precursor is agglomerated and has a particle size distribution with a d50 between 4-10 micrometer, then preferably at least 20% of the transition metal of the final cathode originates from the Ni—Mn—Co precursor, and less than 80% of the transition metal originates from the LiCoO$_2$ precursor.

Second typical implementation: it is also preferred if the Ni—Mn—Co precursor consists of very small particles. An example is a jet-milled mixed hydroxide with typical particles below 0.5-1.5 micrometer. In this case preferably less than 20 or even 15% of the transition metal of the final cathode originate from the Ni—Mn—Co precursor, whereas at least 80, preferable 85% originate from the cobalt precursor. The cobalt precursor, preferably, consists of large particles (d50>10-20 micrometer) which are dense and monolithic. Suitable cobalt precursors are commercial $LiCoO_2$, or high density (tap density>2 $g/cm^3$) cobalt hydroxide, oxyhydroxide or carbonate. Suitable shape of the precursors are spherical or irregularly potato shaped particles, for example.

The two typical implementation are not to be seen as alternatives, rather as two extreme examples. It would, for example, be possible to use a Ni—Mn—Co precursor with bimodal size distribution, containing small (below 0.5-1.5 micrometer) and larger (4-8 micrometer) agglomerated particles, where a large fraction of small particles are consumed to form the islands and where a large fraction of the larger particles disconnects during sintering. It is also possible to use smaller cobalt particles and submicrometer MOOH, in this case an extreme high rate performance can be expected The reaction—formation of a manganese containing island, accompanied by cation exchange between cobalt and nickel—is the same in both implementations. The inventors believe that an essential aspect which causes the formation of the island morphology is the lower mobility of (4 valent) manganese compared to that of 3 valent nickel in $LiCoO_2$ and 3 valent cobalt in $LiM'O_2$. Also, the (4 valent) manganese does not take part in the electrochemical insertion/extraction of lithium during charge/discharge of the batteries some of the manganese can be replaced by other cations. A suitable cation is also titanium. Similar as manganese it is electrochemically inert, has low mobility and it can be doped into a Ni—Mn—Co precursor. For example, similar as manganese, titanium can be doped into $LiNiO_2$.

Another important aspect of the invention is that a high rate performance is achieved even if the cathode material is slightly Lithium sub-stoichiometric. We observed that the highest rate performance is achieved if the total lithium content per transition metal was approx. 0.98, i.e. less than unity. This is very surprising, because in the case of lithium transition metal oxides $Li_{1+z}M_{1-z}O_2$ where M contains nickel it is widely accepted that a lithium deficiency causes cation mixing (that are nickel atoms misplaced on crystallographic lithium sites), and the increased cation mixing causes a poor rate performance.

Figure 3C:
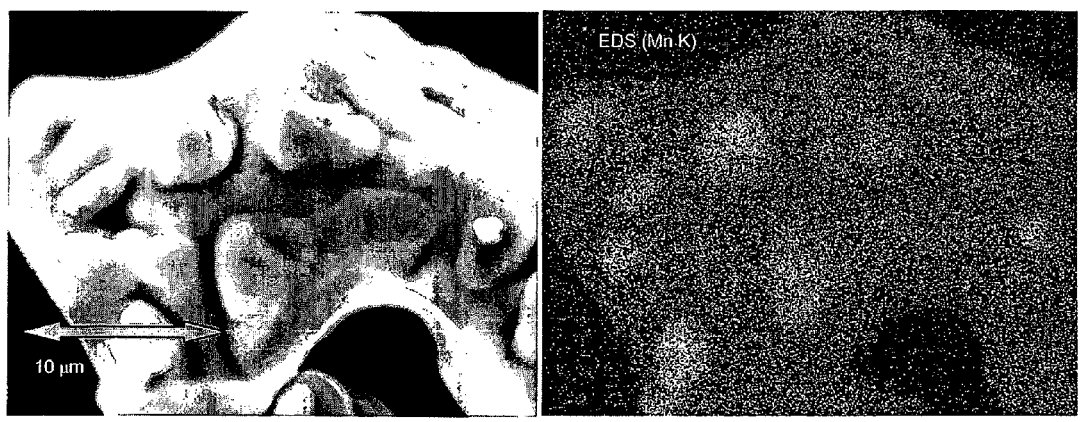
Figure 4:
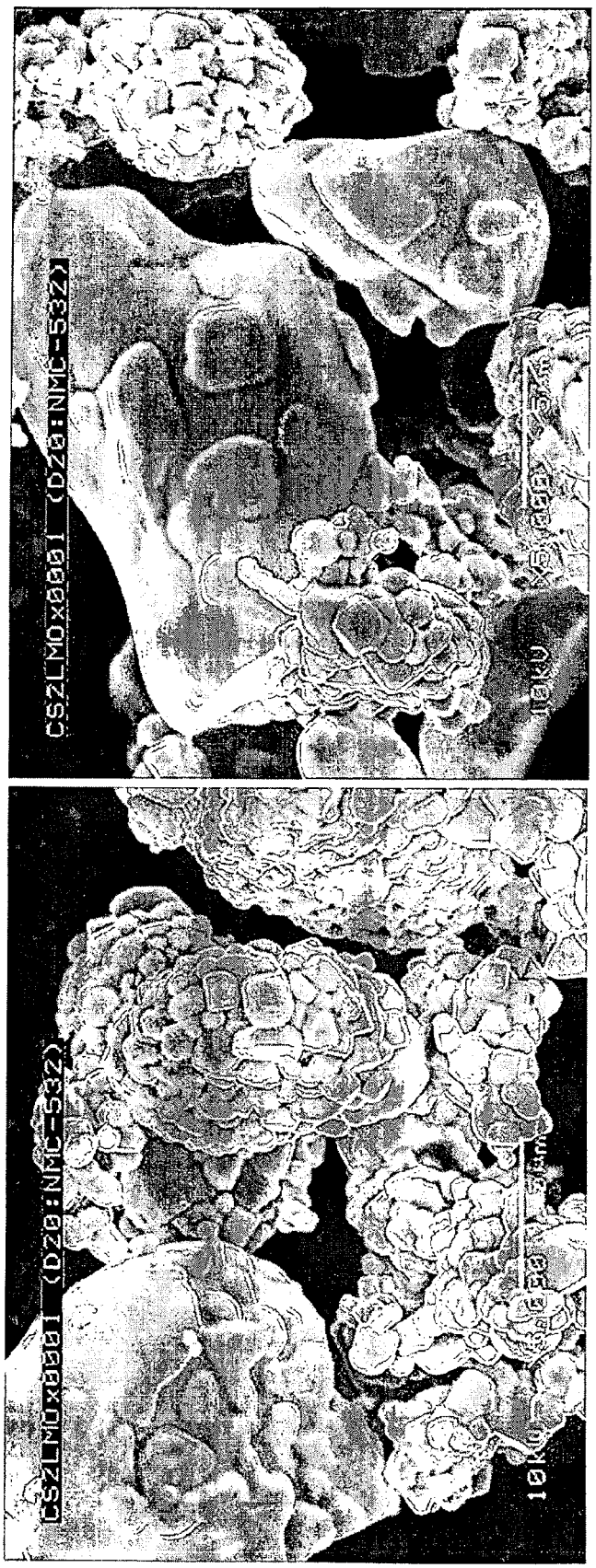
Figure 5:
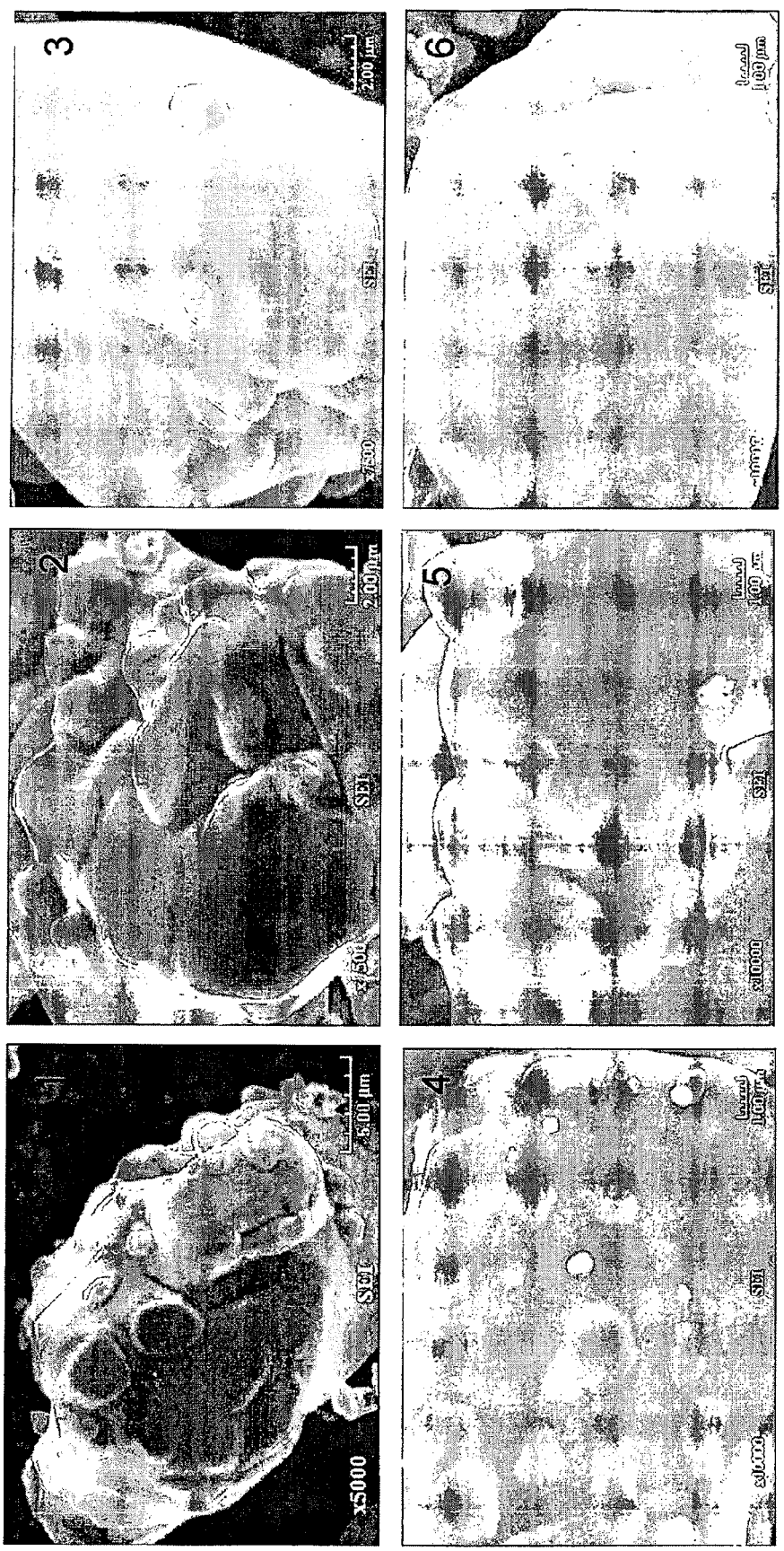
Figure 6:
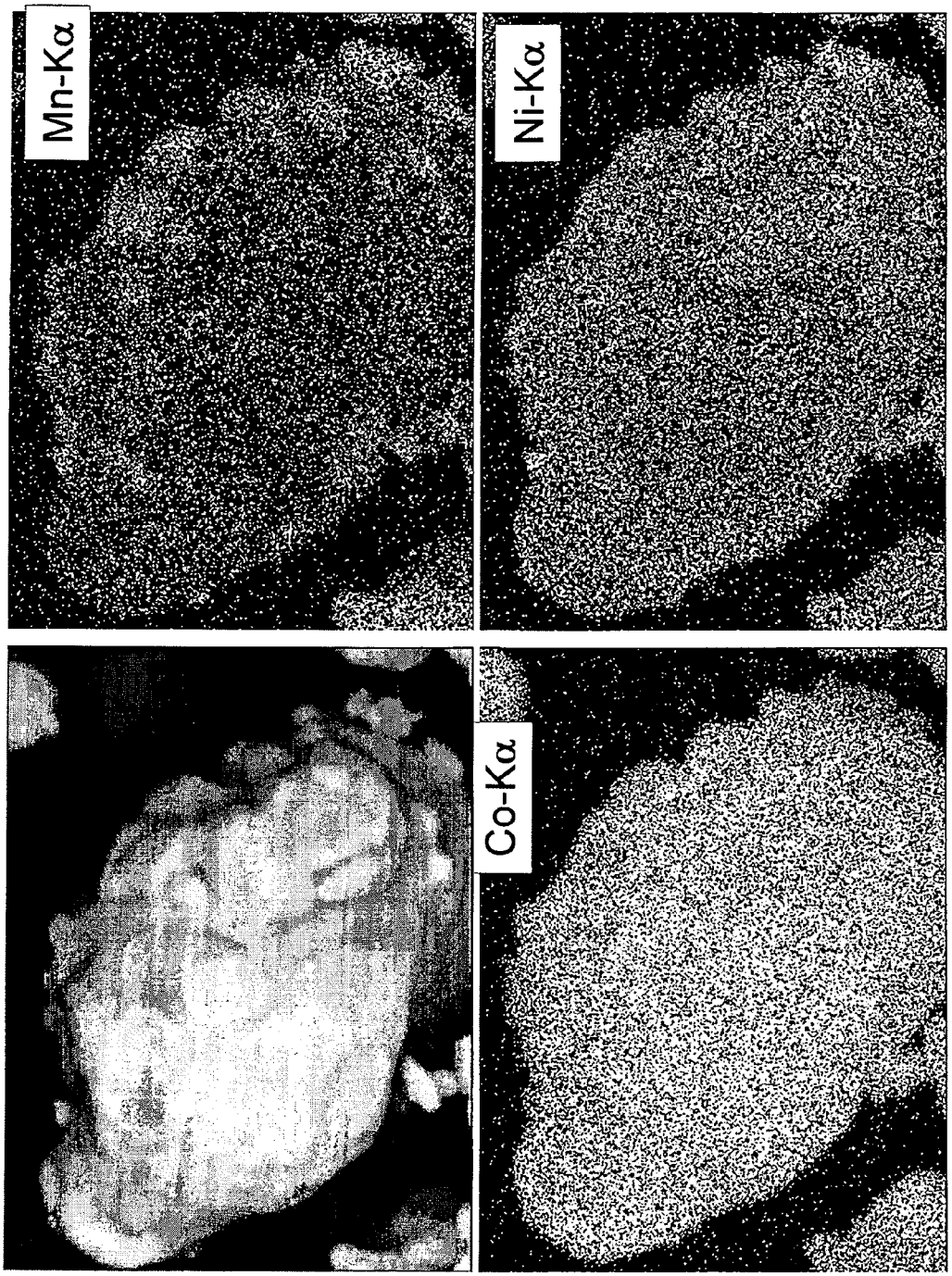
Figure 7:
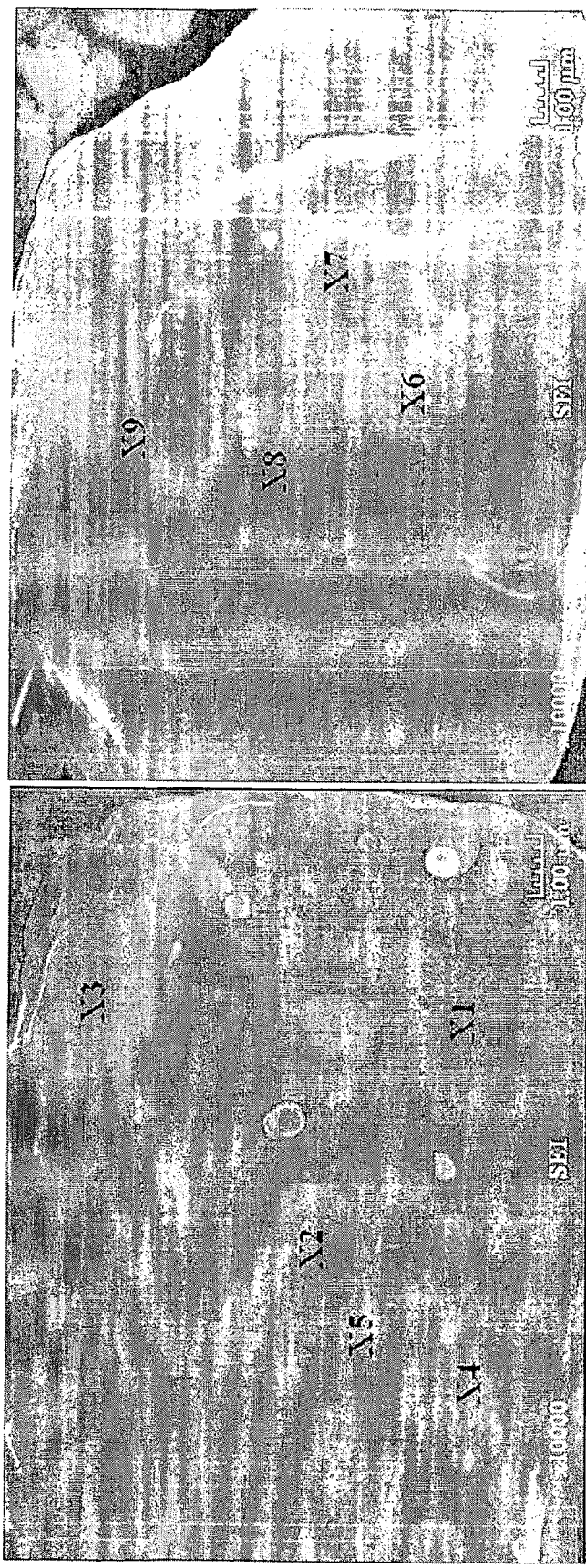
Figure 8:
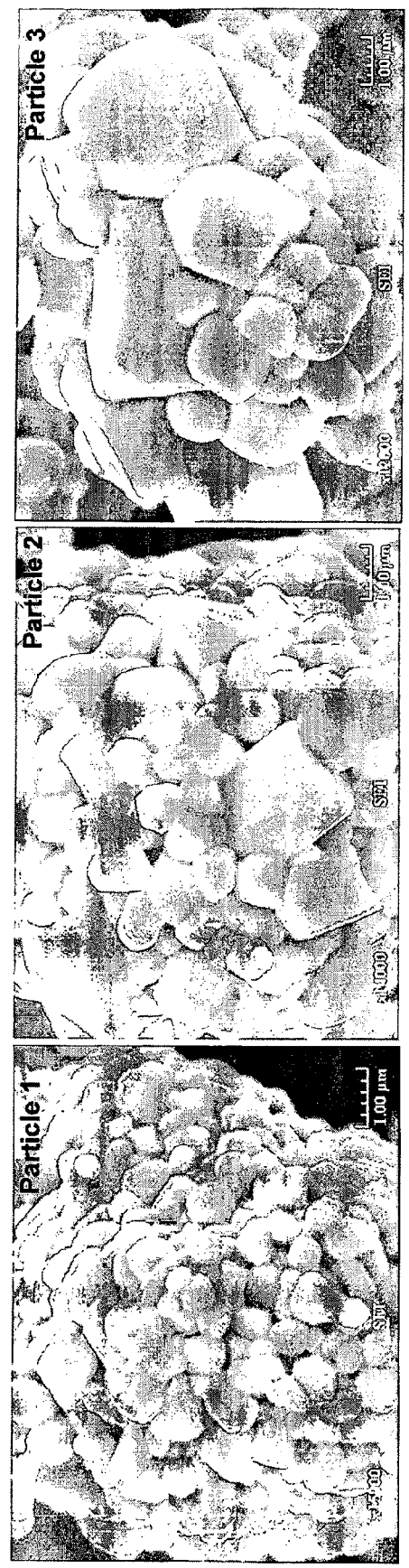
Figure 9:
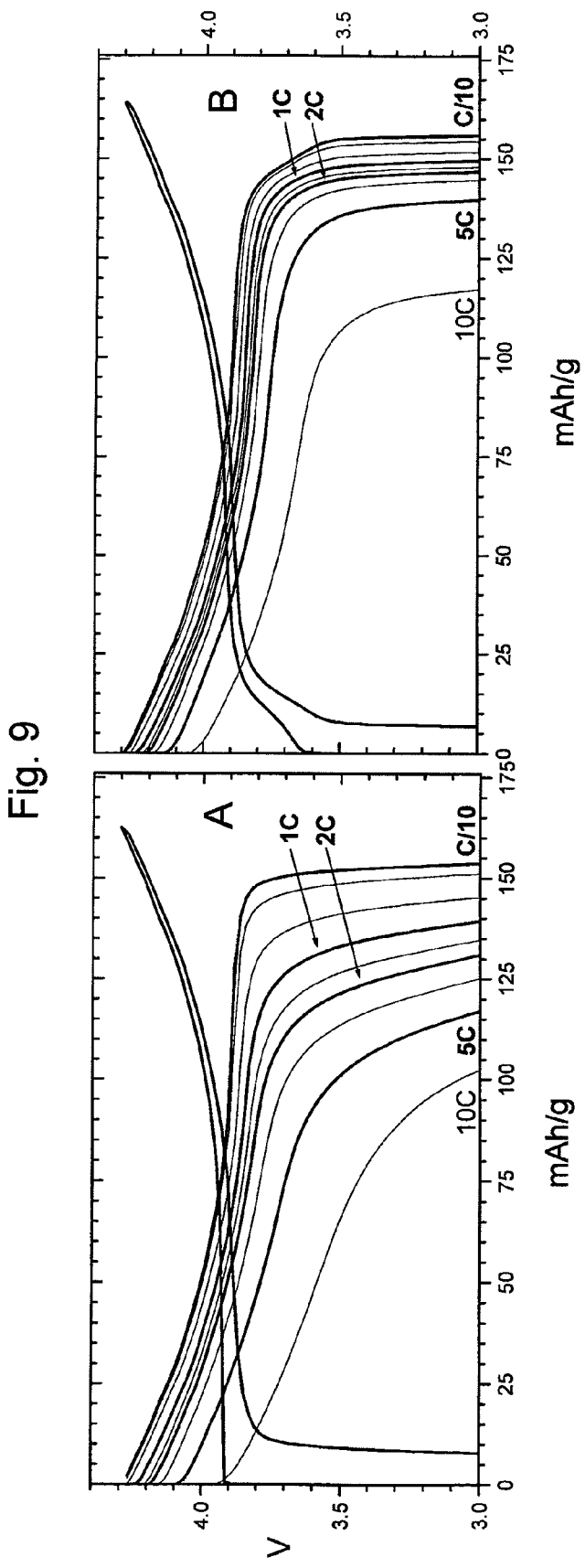
Figure 10B:
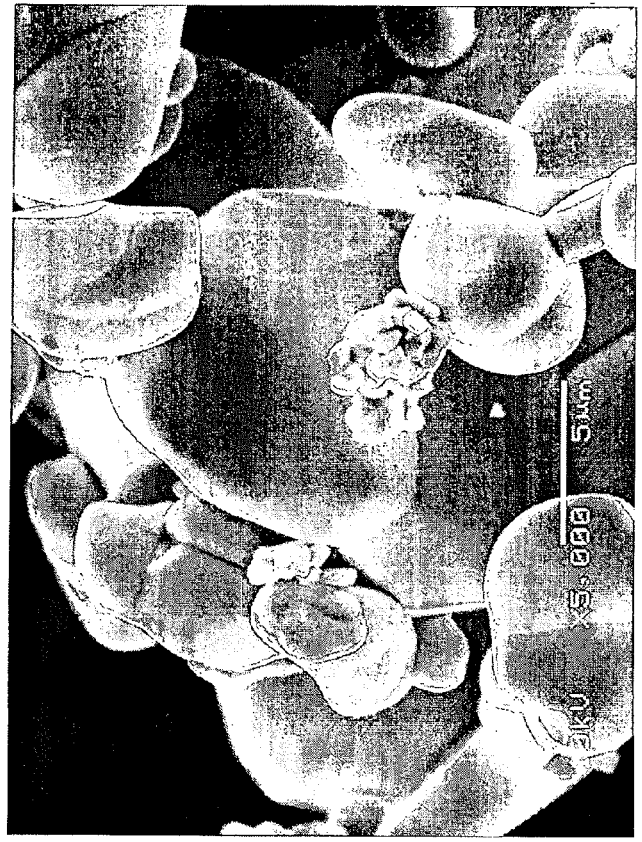
Figure 10A:
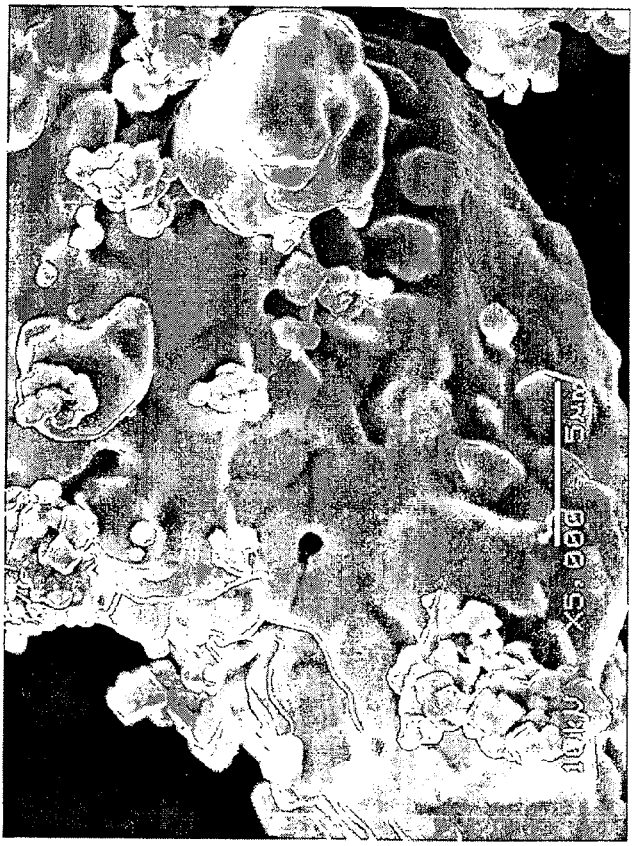
Figure 11:
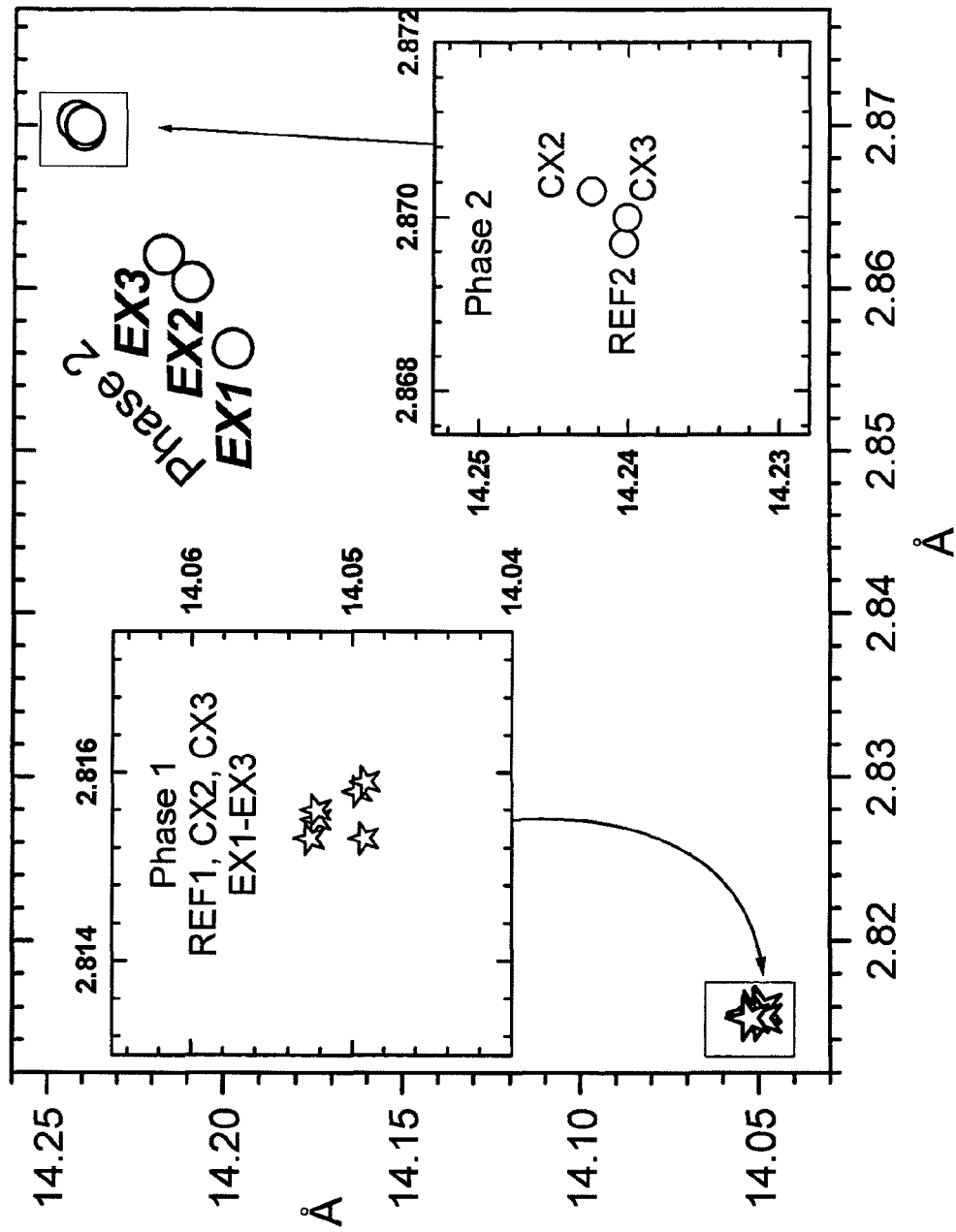
Figure 12:
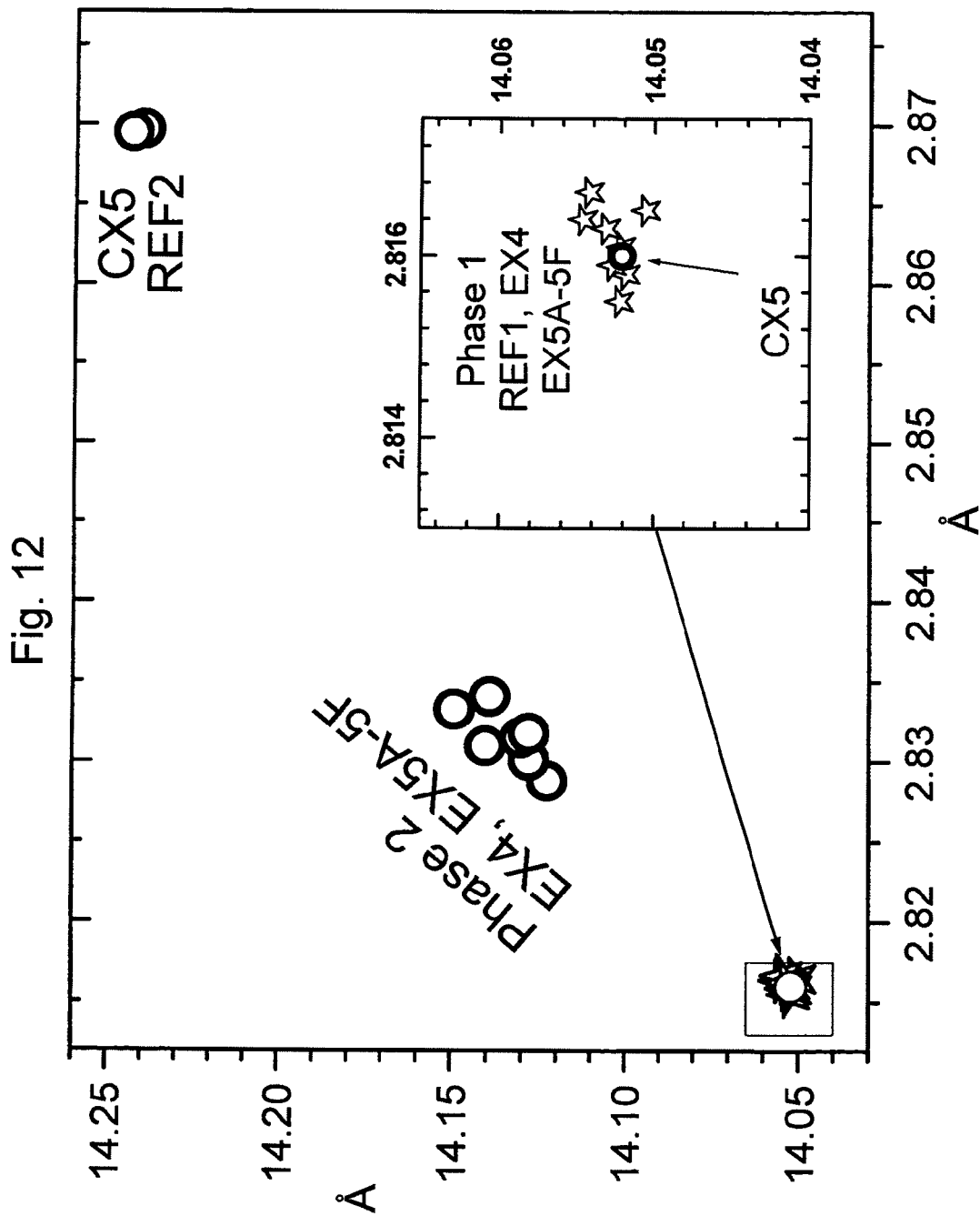
Figure 13:
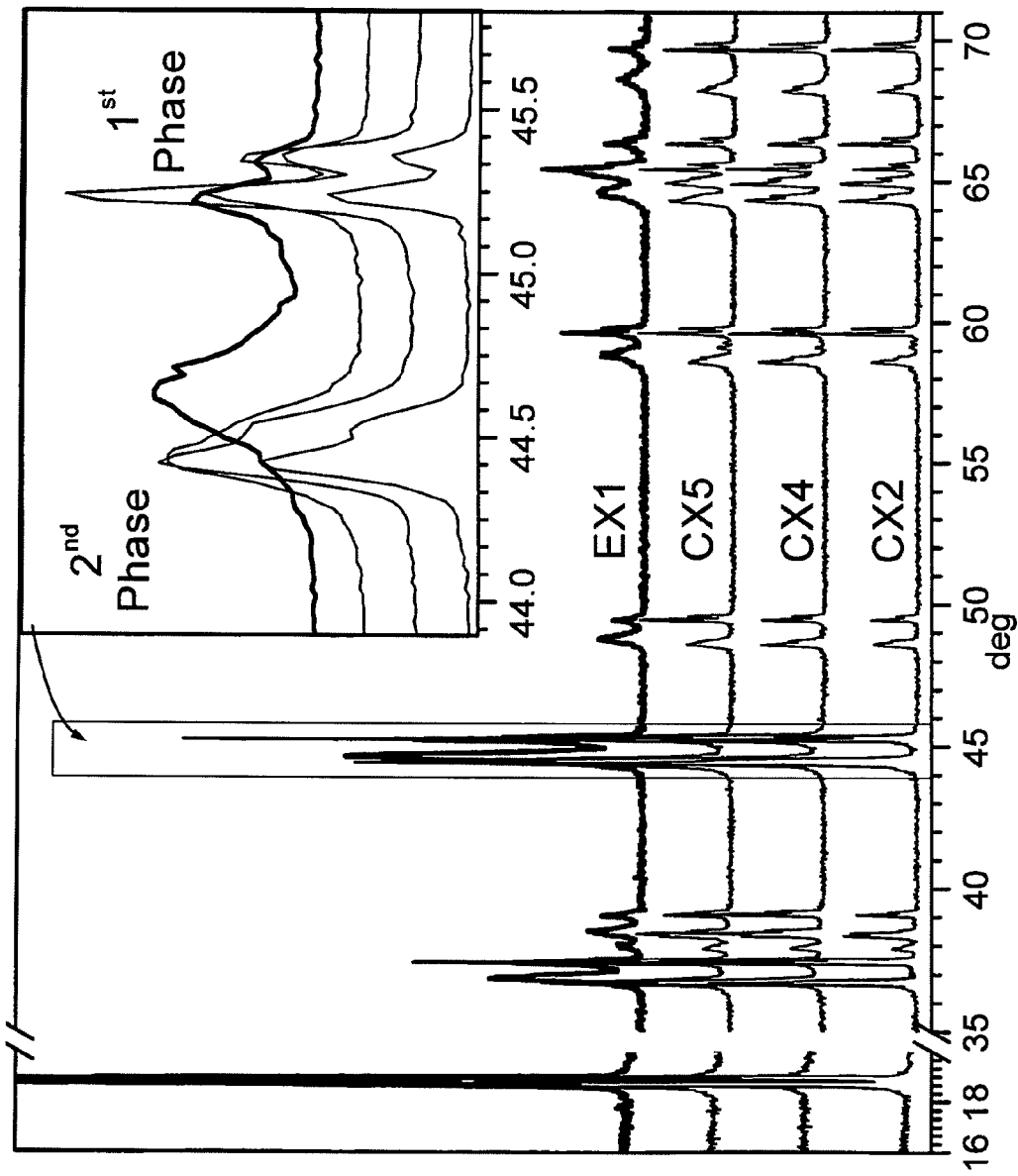
Figure 14:
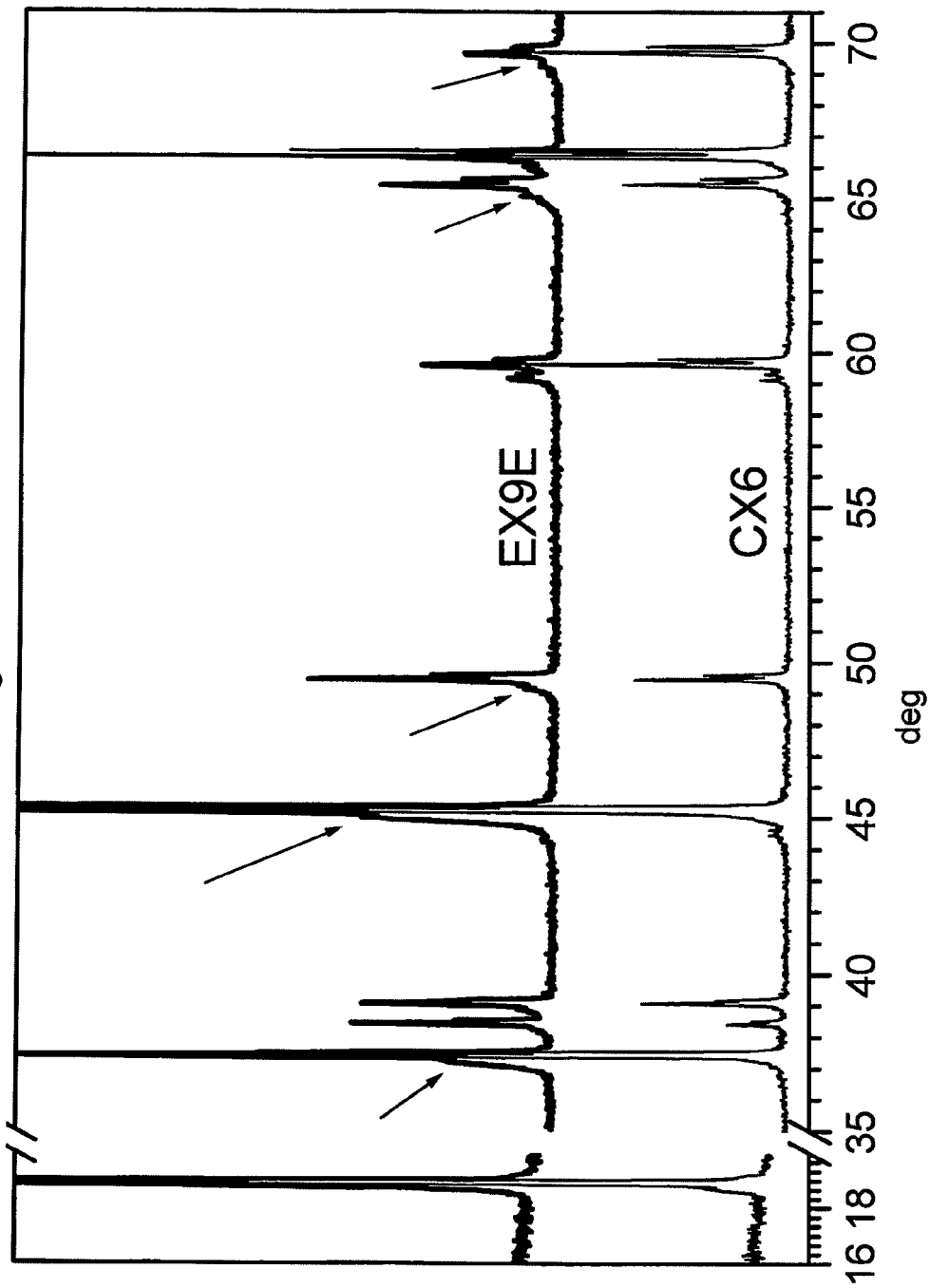

The Figures illustrating the invention are summarized as follows:

FIG. 1: SEM micrographs of the samples REF1 and REF2.
FIG. 2: SEM micrograph of the samples CX2 and CX3.
FIG. 3: SEM micrograph of the sample EX1 and EX3.
FIG. 4: SEM micrographs of the samples EX2—phase 1 and 2.
FIG. 5: SEM micrographs of particles of EX1 for EDS analysis.
FIG. 6: EDS mapping for a phase 1 particle of EX1.
FIG. 7: SEM micrographs of particles of EX1 for EDS analysis.
FIG. 8: SEM micrographs of phase 2 particles of EX1 for EDS analysis.
FIG. 9: Cycling behaviour of commercial $LiCoO_2$ (REF1) and sample EX4.
FIG. 10: SEM micrograph of sample EX5E and CX6.
FIG. 11: Crystallographic map of REF1-2, CX2-3 and EX1-3.
FIG. 12: Crystallographic map of REF1-2, CX5 and EX4-5.
FIG. 13: X-ray diffraction pattern of CX2, CX4 & CX5, and EX1.
FIG. 14: X-ray diffraction pattern of CX6 and EX9E.

Figure 15:
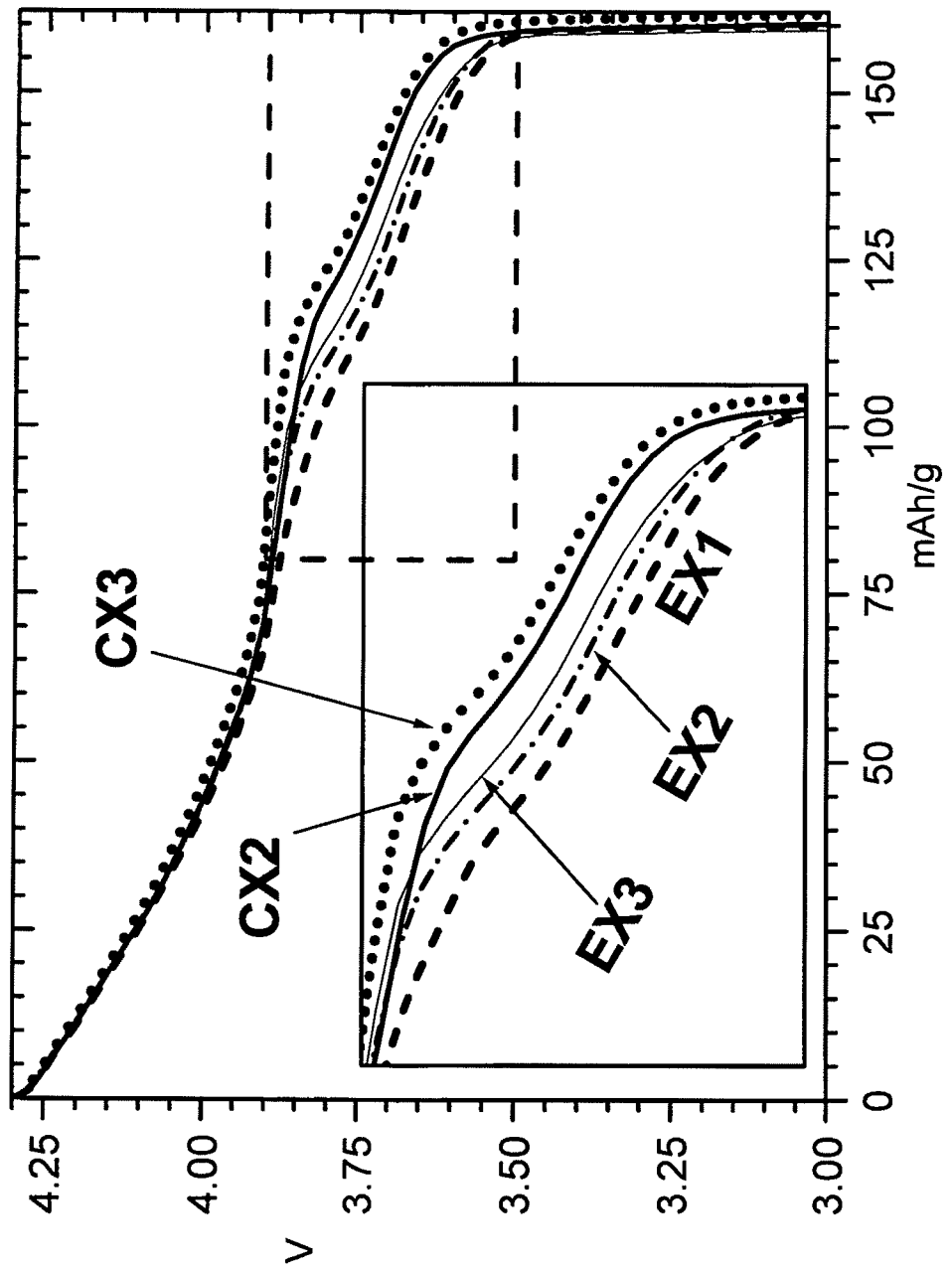
Figure 17:
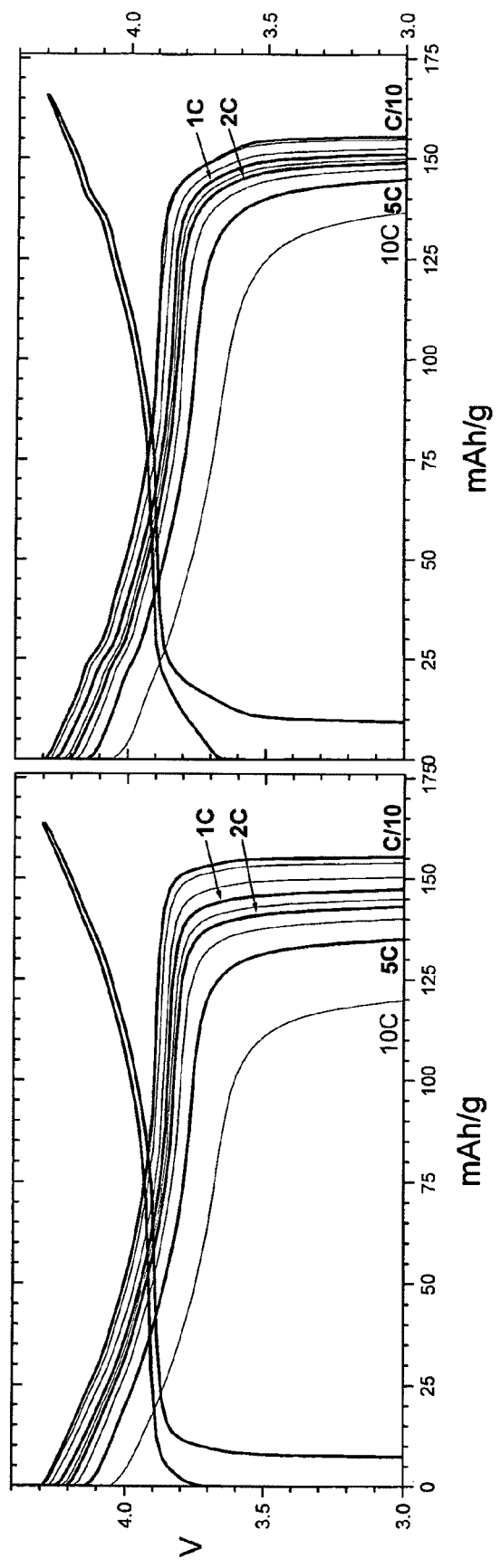

FIG. 15: The voltage profile of CX2, CX3 and EX1-EX3 during slow discharge.
FIG. 16: Cycling behaviour and rate performance of sample EX1.
FIG. 17: Rate performance of sample CX6 is compared with EX5E.

In the following examples some aspects of the actual invention will be further explained.

The following Tables give an overview of the test conditions and results.

Table 1 gives a summary of samples and preparation conditions.

Table 2 gives a summary of X-ray and BET surface are data.

Table 3 gives a summary of the electrochemical results obtained from coin cells.

REFERENCE EXAMPLES

The following reference samples were used:
REF1-$LiCoO_2$ is a commercial $LiCoO_2$ and has a d50 of ≈20 μm and consists of monolithic, dense particles.
REF2-$LiM'O_2$ has been prepared from mixed hydroxide MOOH and $Li_2CO_3$ at 950° C. in air; the Li:M ratio was Li:M'=1.01:1, and M'=$Ni_{0.53}Mn_{0.27}Co_{0.2}$. REF2 has an agglomerated morphology.

Both sample REF1 and REF2 were re-heated at 850° C. during 8 hrs before coin cell assembly and BET measurement. X-ray diffraction pattern is measured and a Rietveld refinement is performed. FIG. 1 shows SEM micrographs of the samples REF1 and REF2. The left figure shows REF1 in a 1000× magnification. Particles are irregularly shaped. No island morphology is present. The right figure shows REF2 in a 2500× magnification. Particles are agglomerated consisting of primary crystallites sintered into larger irregularly shaped secondary particles.

Calculated Example

For a hypothetical calculated sample CC1, being a mixture of 60% REF1-$LiCoO_2$ and 40% REF2-$LiM'O_2$ expected values for BET surface area, capacities and rate performance are estimated by calculating the weighed average of the corresponding values of REF1 and REF2.

Comparative Examples

Example CX2 a cathode powder is prepared by mixing 60% of REF1-$LiCoO_2$ with 40% REF2-$LiM'O_2$. Before mixing, both REF1-$LiCoO_2$ and REF2-$LiM'O_2$ were heat treated at 850° C. during 5 hrs in air. The total composition of the final CX2 cathode is $LiM'O_2$ with M'=$Co_{0.68}Ni_{0.21}Mn_{0.11}$. FIG. 2a shows a SEM micrograph (5000× magnification) of the mixed sample CX2. BET surface area of the mixed powder CX2 is measured. No island morphology can be observed. Coin cells are prepared and the capacity, irreversible capacity, cycling stability and rate performance is measured. X-ray diffraction pattern is measured and a Rietveld refinement is performed. SEM micrographs are taken.

Tables 2 and 3 show that sample CX2 has properties which are roughly similar as the weighed average of the precursors, in hypothetical sample CC1. The mixing does not bring a significant benefit in rate performance or cycling stability. The SEM micrograph confirms the absence of island morphology of $LiCoO_2$ particles. The Rietveld refinement confirms that the lattice constants obtained from the X-ray pattern of the mixture is the same as the lattice constants obtained from the X-ray pattern of the $LiCoO_2$ and $LiM'O_2$, respectively.

Example CX3 a cathode powder is prepared by mixing 60% of REF1-$LiCoO_2$ with 40% REF2-$LiM'O_2$. The mixture is heat treated at 850° C. during 5 hrs in air resulting in sample CX3. The total composition of the cathode is $LiM'O_2$ with $M'=Cu_{0.68}Ni_{0.21}Mn_{0.11}$, the same as CX2. FIG. 2b shows a SEM micrograph of the sample CX3. The magnification is 2500×. No island morphology is present.

Apparently, properties like cycling stability and rate performance of sample CX3 (being a heat treated mixture) are slightly improved compared to CX2 (being a mixture of heat treated samples). The Rietveld refinement confirms that the lattice constants of the composing compounds $LiM'O_2$ and $LiCoO_2$ have not significantly changed during the heat treatment. The constants of REF1 is the same as those of phase 1 in CX2 and CX3, and the lattice constants of REF2 is the same as those of phase 2 in CX2 and CX3.

Example CX4 a cathode powder, being a heat treated mixture, is prepared identically to the procedure described in comparative example CX3, with the exception that the heating was made at 900° C. for 5 hrs instead of 850° C. for 5 hrs, resulting in sample CX4. Coin cells are prepared. X-ray diffraction pattern is measured and a Rietveld refinement is performed. SEM micrographs are taken.

Tables 2 and 3 show that sample CX4 has properties which are roughly similar to those of CX3 which was prepared at lower temperature. The SEM micrograph show that an island morphology is basically absent. X-ray diffraction shows a phase mixture of two phases, the first having the lattice constants of REF1-$LiCoO_2$, the second having the lattice constants similar as sample REF2-$LiM'O_2$. Obviously, no significant diffusion of Co from phase 1 $LiCoO_2$ into the second phase $LiM'O_2$ has occurred. The rate performance is similar as that of sample CX3. This comparative example showed that an increasing of heat treatment temperature from 850° C. to 900° C. does not bring any significant improvement of coin cell performance.

Examples of the Invention

Example 1 (EX1)

a cathode powder is prepared by mixing 60% of commercial $LiCoO_2$ (Sample REF1) with 40% MOOH mixed transition metal hydroxide and $Li_2CO_3$. The $Li_2CO_3$:MOOH ratio and the mixed hydroxide is the same as used for the preparation of REF2-$LiM'O_2$. The total composition of the cathode powder is $LiM'O_2$ with $M'=Cu_{0.68}Ni_{0.21}Mn_{0.11}$, the same as the total composition of CX2 and CX3. The mixture is heated at 970° C. during 8 hrs in air, resulting in sample EX1.

Coin cells are prepared. X-ray diffraction pattern is measured and a Rietveld refinement is performed. SEM micrographs are taken. FIG. 3a shows a SEM micrograph of the sample EX1. The magnification is 5000×. Two types of particles are present: (a) Phase 1: dense, irregularly shaped $LiCoO_2$ based particles having the particularly island morphology and (b) Phase 2: Agglomerated type $LiM'O_2$ particles: the primary crystallite size have a broadened distribution. Phase 1 is clearly illustrated in FIG. 3c. The EDS analysis (see below) emphasizes the presence of Mn in the islands on the surface of the modified $LiCoO_2$ particles.

Properties such as cycling stability and rate performance are much better than for hypothetical sample CC1 and significantly improved if compared with the samples CX2 and CX3.

The SEM micrograph confirms the presence of island morphology of $LiCoO_2$ particles. The Rietveld refinement confirms that the lattice constants of phase 1 ($LiCoO_2$) has not changed during the heat treatment but the lattice constant of phase 2 ($LiM'O_2$) has changed significantly. The change of lattice constant of $LiM'O_2$ proves that a significant exchange of cations between phase 1 and phase 2 has taken part.

Examples EX2 and EX3 cathode powders were prepared and investigated similarly to EX1 of Example 1 with the exception that the sintering temperature was 960 and 950° C. respectively (sintering time: 8 hrs). FIG. 3b shows a SEM micrographs of the sample EX3. FIG. 4 shows a SEM micrographs of the two phases of sample EX2: the left pictures shows predominantly phase 2 particles, the right picture predominantly phase 1 particles, where it can also be seen that the phase 1 particles are much larger than the smaller phase 2 agglomerates.

Again, properties such as cycling stability and rate performance are much better than for hypothetical sample CC1 and significantly improved if compared with the samples CX2 and CX3.

The SEM micrograph confirms the presence of island morphology of $LiCoO_2$ particles. The Rietveld refinement confirms that the lattice constants of $LiCoO_2$ has not changed during the heat treatment but the lattice constant of the $LiM'O_2$ phase has changed significantly. Comparing EX1, 2 and 3, it can be concluded that the change is more significant at higher temperature, indicating that (a) the amount of Co diffusing into $LiM'O_2$ increases with temperature but, at the same time (b) the improved properties do not depend sensitively on the amount of Co in the $LiM'O_2$ phase.

EDS Analysis of Samples

Using energy-dispersive X-ray spectrometry (EDS) the composition of the $LiCoO_2$ (phase 1) and $LiM'O_2$ (phase 2) of the samples CX2 and CX3 (comparative examples) and of example EX1 can be studied.

EDS analysis is a powerful tool to investigate the composition of particles near to the surface. EDS is especially powerful to monitor changes and trends, but it is less powerful to get accurate quantitative results. Table 4 discloses results of the EDS analysis of the reference samples REF1 and REF2 which will be used as reference points for the EDS analysis of the more complex samples CX2, CX3 and EX1.

Sample REF1 ($LiCoO_2$) was investigated by EDS spectroscopy. A spectrum measured from many particles was collected. The magnification was 1000×, the region which was scanned is the one shown in FIG. 1. Similar the EDS spectrum of sample REF2 was collected at 1000× magnification.

TABLE 4

ICP and EDS measurement of transition metal contents of REF 1 and 2.

| Sample | Composition (from ICP) | Transition metal content (from EDS in mol %) | Impurity (from EDS in mol %) |
|---|---|---|---|
| REF 1 | $Li_{1.02}Co$ | Mn: 0.00<br>Co: 99.56<br>Ni: 0.00 | $SO_4$: 0.44 |
| REF2 | Li:M' = 0.97<br>M' = $Co_{0.21}Mn_{0.264}Ni_{0.526}$<br>$SO_4$:M = 0.009 | Mn: 27.34<br>Co: 20.72<br>Ni: 50.39 | $SO_4$: 1.55 |

Comparing the results obtained from ICP chemical analysis and EDS analysis shows that EDS (1) estimates the transition metal ratios approximately correctly (2) exaggerates the sulfur content (sulfur impurity possibly located at the surface)

The cathode sample EX1 was investigated by applying EDS analysis to single particles. The EDS spectrum of 6 different particles of phase 1 was obtained. All particles showed the island morphology. The SEM micrographs of the 6 particles are shown in FIG. 5.

EDS analysis clearly shows that particles of phase 1 ($LiCoO_2$), contain large amounts (>15%) of nickel and manganese. (see Table 5 below) This is very surprising because the Rietveld refinement of the X-ray diffraction pattern showed that phase 1 (containing Ni and Mn) has the same lattice constants as $LiCoO_2$. Furthermore, 5 of the 6 particles have a Ni:Mn ratio above 3.0. This shows that more nickel than manganese has diffused into the 1$^{st}$ phase. During sintering an exchange of cations has taken place where dominantly nickel but also manganese has entered from the $LiM'O_2$ particles into the $LiCoO_2$ particles. The EDS analysis also confirms that particles of the 1$^{st}$ phase ($LiCoO_2$) have a distribution of composition with a varying transition metal composition.

TABLE 5

EDS measurement of transition metal contents of particles of EX 1

| Sample EX1 | Ni (mol %) | Mn (mol %) | Co (mol %) | Ni:Mm molar ration | (Ni + Mn)/M molar fraction (%) |
|---|---|---|---|---|---|
| Particle #1 | 14.01 | 3.22 | 82.77 | 4.35 | 17 |
| Particle #2 | 13.74 | 3.47 | 82.78 | 3.96 | 17 |
| Particle #3 | 18.67 | 5.42 | 75.9 | 3.44 | 24 |
| Particle #4 | 10.62 | 5.54 | 83.46 | 1.92 | 16 |
| Particle #5 | 17.46 | 4.77 | 77.57 | 3.66 | 22 |
| Particle #6 | 18.49 | 6.07 | 75.25 | 3.05 | 25 |

2 particles (Particle #1 and particle #2) of the 6 particles of Table 5 were investigated by EDS mapping. The EDS mapping of particle #1 in FIG. 6 shows that "islands" have a higher content of manganese whereas the areas in-between the island, the "oceans" (or bulk) have a low content of manganese. Particles #4 and #6 were further investigated by spot EDS analysis (see Table 6). FIG. 7 shows the locations of the spots. Spot spectra were collected.

TABLE 6

EDS measurement of transition metal contents of different regions of particles of EX 1

| Sample EX1 | | Island Ocean | Ni (mol %) | Mn (mol %) | Co (mol %) | Ni:Mm molar ration | (Ni + Mn)/M molar fraction (%) |
|---|---|---|---|---|---|---|---|
| Particle #4 | Spot X2 | I | 5.91 | 8.27 | 85.75 | 0.71 | 14 |
| | Spot X4 | I | 7.39 | 7.66 | 84.92 | 0.96 | 15 |
| | Spot X5 | O | 2.97 | 1.98 | 95.05 | 1.50 | 5 |
| Particle #6 | Spot X6 | I | 21.75 | 8.62 | 69.63 | 2.52 | 30 |
| | Spot X7 | I | 20.80 | 12.88 | 66.27 | 1.61 | 34 |
| | Spot X8 | O | 11.43 | 1.55 | 87.02 | 7.37 | 13 |
| | Spot X9 | O | 14.48 | 1.92 | 83.34 | 7.54 | 16 |

All "island" spots (X2, X4, X6, X7) have a clearly lower Ni:Mn ratio than that of the whole particle (Table 5). All "ocean" spots (X5, X8, X9) have a much lower manganese content than that of the whole particle. The example confirms that particles with island morphology have high Mn content in most islands and low manganese content in-between islands. Obviously there exists a manganese gradient with islands being the center of the gradient.

The EDS spectrum of 3 single particles of the second phase ($LiM'O_2$) of sample EX1 was collected. These particles originate from the MOOH which has the same metal composition as sample REF2, with Ni:Mn ratio of approx. 2.0 and a cobalt content of approx. 20%. FIG. 8 shows the SEM micrographs. These three particles obviously have different sized crystallites. Particle 1 (left) has crystallites of approx. 0.5-1.5 μm; Particle 2 (middle) has crystallites of approx. 1-2 μm and Particle 3 (right) has crystallites of approx. 1.5-3 μm. Similar, the EDS spectra of single $LiM'O_2$ particles (phase 2) of sample CX2 and CX3 was collected. All results are reported in Table 7.

TABLE 7

EDS measurement of transition metal contents of second phase ($LiM'O_2$)

| Sample | | Ni (mol %) | Mn (mol %) | Co (mol %) | Ni:Mn molar ration | (Ni + Mn)/M molar fraction (%) |
|---|---|---|---|---|---|---|
| REF 2 | many particles | 50.39 | 27.34 | 20.72 | 1.84 | 79 |
| CX2 | Particle 1 | 49.34 | 26.09 | 24.19 | 1.89 | 76 |
| | Particle 2 | 49.34 | 25.40 | 23.39 | 1.94 | 76 |
| CX3 | Particle 1 | 49.14 | 26.58 | 23.03 | 1.85 | 77 |
| | Particle 2 | 47.34 | 25.86 | 26.22 | 1.83 | 74 |
| EX1 | Particle 1 | 41.18 | 22.32 | 36.13 | 1.84 | 64 |
| | Particle 2 | 39.49 | 21.80 | 38.18 | 1.81 | 62 |
| | Particle 3 | 37.38 | 20.08 | 42.19 | 1.86 | 58 |

The cobalt content of the second phase $LiM'O_2$ particles of sample EX1 has increased significantly during sintering. This is in sharp contrast to the results of $LiM'O_2$ particles of the samples CX2 and CX3 which have roughly the same EDS spectrum as sample REF2. This observation displays that during sintering of EX1 an exchange of cations has taken place where cobalt from the $LiCoO_2$ (phase 1) has entered into the $LiM'O_2$ (phase 2) particles. Furthermore, comparing the SEM micrographs in FIG. 8 and the data of the table shows that the size of primary crystallites and the cobalt content of phase 2 particles of sample EX1 correlate. Obviously, as cobalt diffuses into the LiM'O$_2$, the sinterability of the LiM'O$_2$ is enhanced causing a faster crystallite growth.

Example 4

Jet-Milling of Precursors

A submicrometer sized mixed hydroxide was prepared by jet-milling mixed hydroxide MOOH. The MOOH is the same as used for the preparation of the REF2-LiM'O$_2$. The particle size distribution was measured by laser diffraction. After 3 times jet-milling 80% of the volume consist of particles with size below 1 micrometer.

90% by weight of commercial LiCoO$_2$ (Sample REF1, with 20 micrometer particles) and 10% of the 3 times jet-milled MOOH were mixed with Li$_2$CO$_3$. For 1 mol jet-milled MOOH ½ mol Li$_2$CO$_3$ was added. (The Li:M ratio is the same as used for the preparation of the REF2-LiM'O$_2$.) After mixing the sample was sintered at 970° C. for 8 hrs.

The final sample EX4 was investigated by SEM, BET surface analysis and X-ray diffraction. Coin cells were prepared. Rate performance and cycle stability was measured. FIG. 9 compares the rate performance (cell voltage V vs. capacity in mAh/g) of the commercial LiCoO$_2$ (REF1) on the left (A), with the rate performance of sample EX4 on the right (B). The Figures show the discharge voltage profile during C/10, C/5, C/2, 1C. 1.5C, 2C, 3C, 5C and 10C rate where 1C (corresponding to a discharge in one hour) is defined as 160 mA/g. The temperature was kept constant at 24° C., and the voltage range was 4.3-3.0V. Obviously, the rate performance has been dramatically increased. The SEM micrograph (not shown) clearly shows that an island morphology is present.

Study of Co-Sintering Conditions

A sample CX5 was prepared identically to the samples EX1, EX2, EX3, with the exception that the sintering temperature was lowered to 900° C. (sintering time: 8 hrs). The sample was clearly different from EX1, EX2, EX3. The BET surface area was much larger: 0.35 m$^2$/g. X-ray diffraction shows a phase mixture of two phases, the first having the lattice constants of REF1-LiCoO$_2$, the second having the lattice constants similar as sample REF2-LiM'O$_2$. Obviously, no significant diffusion of Co from the phase 1 LiCoO$_2$ into the second phase LiM'O$_2$ has occurred. Similar, the volume fraction of the 2$^{nd}$ phase is clearly less, this being consistent with less Co having diffused into phase 2 (LiM'O$_2$). The electrochemical properties are inferior (Table 3). A poor cycling stability is observed (the fading rate at 4.5V is about 2-3 times faster than that of samples EX1-EX3). The rate performance is significantly lower (87.5% at 3C rate, compared with 90-91% for samples EX1, EX2, EX3. The rate performance is similar as that of sample CX3. The SEM micrographs (not shown) shows some small LiM'O$_2$ particles attached on the surface of the larger LiCoO$_2$, but an island morphology is basically absent.

A cathode powder CX6 is prepared and analyzed identically to the cathode powder of Example 4. However, a different precursor for the second phase LiM'O$_2$ was used. In this example 90% REF1 LiCoO$_2$ are mixed with 10% of a jet-milled precursor and 0.05 mol % Li$_2$CO$_3$. The precursor is lithium deficient Li$_{1-x}$M$_{1+x}$O$_2$. The precursor was prepared similar as the REF2-LiM'O$_2$ with the exception that the Li:M ratio was 0.9 and the temperature was 900° C. After preparation, the precursor was jetmilled twice, resulting in a submicrometer particle product. Particle size distribution was measured by laser diffraction in water. The particle size distribution is bi-modal, with about 50% of the volume having a size between 0.05-1 µm (maximum at approx. 0.3 µm) and the remaining 50% of the volume have a size between 1-6 µm (maximum at approx. 2 µm). The mixture was heated at 970° C. for 8 h in air. X-ray diffraction pattern is measured and a Rietveld refinement is performed. SEM micrographs are taken. Coin cells are prepared.

The ray diffraction pattern shows basically one phase with lattice constants similar to LiCoO$_2$. A second LiM'O$_2$ cannot be clearly distinguished. (This is different to the sample of Example 4 which clearly showed the presence of a second Phase). FIG. 10b shows a SEM micrograph. Very few LiM'O$_2$ particles (=phase 2) of agglomerated type are present. Almost all particles are LiCoO$_2$ based (=phase 1). These particles generally have a very smooth surface. Clearly, island morphology is absent. Consistent with this observation is the observed very low BET surface area of only 0.14 m$^2$/g Apparently, the sample CX6 has been sintered more efficiently than the sample EX4. Possibly too much cobalt has diffused from the phase 1 LiCoO$_2$ into the phase 2 LiM'O$_2$. At the same time, the small LiM'O$_2$ particles have been consumed by the larger LiCoO$_2$ particles, and possibly, the manganese cations in the LiCoO$_2$ have been diluted, and as a result, island morphology is absent. The compositions of phase 2 and phase 1 effectively have approached each other. The second phase, even comprising a larger fraction of the cathode than in the case of less sintered samples, now is very similar to phase 1 and the phases cannot be clearly distinguished anymore, for example by X-ray.

Electrochemical Testing Shows that:
(a) The slope of voltage profile at the end of discharge disappeared—this is consistent with phase 2 LiM'O$_2$ basically being absent,
(b) The rate performance is significantly lower than that of sample EX4,
(c) the cycling stability is inferior It can be concluded that the island morphology and the presence of a second phase is essential to obtain a high rate performance. Furthermore, there exists a quite narrow window to achieve high rate cathodes. If the sintering is too strong (Sample CX6), the islands disappear because of high transition metal diffusion, if the sintering is not enough (Sample CX3 and CX4) then islands don't form because of unsufficient transition metal diffusion. Table 2 and 3 summarize the obtained data. In order to perform the process of the invention correctly, it is necessary to establish a temperature vs. sintering time matrix where the SEM micrographs of the obtained product clearly shows the island configuration of EX1-4. If co-sintering has not occurred phase 2 is clearly distinguished and pure LiCoO$_2$, without island morphology, is observed. If the co-sintering has taken place too intensively, phase 2 has nearly disappeared, and the resulting Li—Co—Ni—Mn-oxide has a smooth surface with rounded edges.

If the two phases LiCoO$_2$ and LiM'O$_2$ are present it is also possible to measure the lattice constants of the obtained samples, and compare them with a reference sample which is a sintered compound obtained only with the precursors needed to obtain phase 2 (absence of LiCoO$_2$ or a corresponding cobalt precursor). The relationship between the obtained lattice constants should be within the limits cited before.

Influence of Sub-Stoichiometry

The following examples (EX5A to F) will show that the electrochemical properties can be further improved if the samples have a slight substoicheometry of lithium. Samples were prepared identically as sample EX4, with the exception that less $Li_2CO_3$ was added, and in some cases the sintering temperature was slightly raised.

In all cases 90% of 20 μm $LiCoO_2$ (=REF1) was mixed with 10% of jetmilled MOOH and $Li_2CO_3$. The molar ratio of Li (in $Li_2CO_3$) to MOOH is given in Table 8 below. Table 8 also displays the sintering temperature and gives results of BET surface area measurement. The column Li:M gives the results for the lithium to transition metal ratio obtained from chemical analysis of the final samples. The chemical analysis results are very similar to the expected values, if keeping in mind that the sample REF1 has a Li:Co of approx. 1.02, and, depending on temperature, always a small amount of lithium evaporates during sample preparation. Obviously, the samples EX5D, EX5E and EX5F are increasingly lithium sub-stoichioemtric. SEM analysis was made and confirms that all 6 samples show island morphology. The SEM micrograph of sample EX5E is displayed in FIG. 10a. X-ray analysis in all cases showed a mixture of two phases (see below).

TABLE 8

Analysis of sub-stoicheometric samples (sintering time: 8 hrs)

|  | Li:M | T | BET $m^2\backslash g$ | Li:M Chemical analysis |
|---|---|---|---|---|
| EX5A | 0.98 | 970° C. | 0.19 |  |
| EX5B | 0.96 | 970° C. | 0.21 |  |
| EX5C | 0.85 | 970° C. | 0.22 | 1.0 |
| EX5D | 0.7 | 970° C. | 0.23 | 0.991 |
| EX5E | 0.7 | 985° C. | 0.20 | 0.986 |
| EX5F | 0.65 | 985° C. | 0.21 | 0.972 |

Coin cells were prepared and tested in similar conditions as described before. The results are summarized in Table 9 below.

Electrochemical data were obtained from two sets of two coin cells. The first set of two cells was tested using a cycling stability schedule. The other set was tested using a rate performance schedule. The cycling stability schedule gives the following numbers: Qrev, Qirr, fade rate (C/10) and fade rate (C1), listed in Tables 3 and 9. The electrochemical data are the average of each set of two cells. Qrev and Qirr are the reversible capacity (mAh/g) and irreversible capacity (%, Qirr=[QCh−QDC]/QCh) of the first cycle, measured at C/10 rate. The numbers of the fade rate at C/10 is obtained by comparing the discharge capacity at the slow (C/10) $3^{rd}$ and $41^{st}$ cycle, the fade rate at 1C is obtained by comparing the discharge capacity at the faster (1C) $4^{th}$ and $42^{nd}$ cycle. From cycle 5 to 40 the cells were cycled at C/5 charge and C/2 discharge rate at 4.5-3.0V. The fade rate is extrapolated to 100 cycles.

The rate performance schedule gives the numbers 1C/0.1C, 2C/0.1C and 3C/0.1C for the rate performance, listed in Table 3 and 9. The schedule is as follows. After 1 slow cycle (C/10) the cells are charged at C/5 rate and discharged at increasing rate (C/5, C/2, 1C, 1.5C, 2C, 3C, 5C and 10C). The voltage range is 4.3-3.0V.

In-order to measure the capacities and rate performance with high reliability, the electrode loading ($g/cm^2$) of cells was different. Cells tested for the stability schedule had approx. 12 $mg/cm^2$ electrode loading. Cells tested with the rate schedule had approx. 5-6 $mg/cm^2$ loading.

TABLE 9

Electrochemical data of sub-stoichiometric samples

|  | $Q_{rev}$ 4.3-3 V C/10 | $Q_{irr}$ (%) | 1C/ 0.1C (%) | 2C/ 0.1C (%) | 3C/0.1C (%) | Fade rate C/10 %/100 | Fade rate C/1 %/100 |
|---|---|---|---|---|---|---|---|
| EX5A | 156.9 | 3.92 | 95.39 | 93.74 | 92.49 | 8.84 | 15.19 |
| EX5B | 157.1 | 3.79 | 95.98 | 94.25 | 92.84 | 8.34 | 13.80 |
| EX5C | 157.3 | 4.32 | 95.76 | 93.66 | 91.49 | 11.06 | 24.66 |
| EX5D | 156.5 | 4.89 | 96.56 | 94.98 | 93.62 | 6.76 | 12.47 |
| EX5E | 156.5 | 4.71 | 96.67 | 95.21 | 94.16 | 5.19 | 7.03 |
| EX5F | 153.7 | 5.84 | 95.57 | 91.86 | 88.42 | 6.69 | 15.01 |

The data in the tables show that the rate performance increases if the Li:M ratio is lowered. The highest rate is obtained for the sample which is approx. 1.5% lithium sub-stoichiometric. At the same time, the 1.5% lithium sub-stoichiometric sample EX5E shows also the highest cycling stability at 4.5V. However, if the lithium sub-stoichiometry is too large, then properties deteriorate. So sample EX5F, which is approx. 3% lithium sub-stoichiometric, has inferior capacity and very poor rate performance.

TABLE 1

Overview of samples (name, composition and preparation)

|  | Sample name | Composition (total) Sinter T | Precursor | Comment |
|---|---|---|---|---|
|  | REF1 | $LiCoO_2$, ≈ 1000° C. |  | D50 ≈ 20 μm |
|  | REF2 | $LiNi_{0.53}Mn_{0.27}Co_{0.2}O_2$ 950° C. | MOOH, $Li_2CO_3$ |  |
| Calc. ex 1 | CC1 | $LiCo_{0.68}Ni_{0.21}Mn_{0.11}O_2$ n/a | — | Weighed average of 60% REF1, 40% REF2 |
| Comparative example 2 | CX2 | $LiCo_{0.68}Ni_{0.21}Mn_{0.11}O_2$ n/a | $LiCoO_2$ $LiNi_{0.53}Mn_{0.27}Co_{0.2}O_2$ | Mixture of pre-heated $LiCoO_2$ and $LiM'O_2$ |
| Comparative example 3 | CX3 | $LiCo_{0.68}Ni_{0.21}Mn_{0.11}O_2$ 850° C. | $LiCoO_2$ $LiNi_{0.53}Mn_{0.27}Co_{0.2}O_2$ | Heated mixture of $LiCoO_2$ and $LiM'O_2$ |
| Comparative example 4 | CX4 | $LiCo_{0.68}Ni_{0.21}Mn_{0.11}O_2$ 900° C. | $LiCoO_2$ $LiNi_{0.53}Mn_{0.27}Co_{0.2}O_2$ | Heated mixture of $LiCoO_2$ and $LiM'O_2$ |
| Comparative example 5 | CX5 | $LiCo_{0.68}Ni_{0.21}Mn_{0.11}O_2$ 900° C. | $LiCoO_2$, MOOH, $Li_2CO_3$ | Heated mixture of $LiCoO_2$, MOOH, $Li_2CO_3$ |
| Comparative example 6 | CX6 | $LiCo_{0.91}Ni_{0.06}Mn_{0.03}O_2$ 970° C. | $LiCoO_2$, $Li_2CO_3$ $Li_{0.9}Ni_{0.53}Mn_{0.27}Co_{0.2}O_2$ | Heated mixture of $LiCoO_2$, jetmilled low T $LiM'O_2$ and $Li_2CO_3$ |
| Example 1 | EX1 | $LiCo_{0.68}Ni_{0.21}Mn_{0.11}O_2$ 970° C. |  |  |

TABLE 1-continued

Overview of samples (name, composition and preparation)

|  | Sample name | Composition (total) Sinter T | Precursor | Comment |
|---|---|---|---|---|
| Example 2 | EX2 | $LiCo_{0.68}Ni_{0.21}Mn_{0.11}O_2$ 960° C. | | |
| Example 3 | EX3 | $LiCo_{0.68}Ni_{0.21}Mn_{0.11}O_2$ 950° C. | | |
| Example 4 | EX4 | $LiCo_{0.91}Ni_{0.06}Mn_{0.03}O_2$ 970° C. | | |
| Example 5 | EX5A-EX5F | $Li_xCo_{0.91}Ni_{0.06}Mn_{0.03}O_2$ 970-985° C. | | |

Crystallographic Maps

The X-ray diffraction pattern of the reference samples REF1, REF2, the comparative samples CX2-CX3, and of the samples EX1-3 was obtained. Samples CX2, CX3, EX1-EX3 are composed of two phases, a first phase, based on $LiCoO_2$ and a second phase, based on $LiM'O_2$. The lattice constants of these phases were obtained by a two phase Rietveld refinement and can be compared to the lattice constants of samples REF1 ($LiCoO_2$) and REF2 ($LiM'O_2$), which were obtained by a one-phase refinement.

Table 2 lists the results. FIG. 11 shows the results in a suitable manner form which the authors call a crystallographic map, plotting the hexagonal c-axis vs. the hexagonal a-axis. The figure gives the crystallographic map of the samples REF1, REF2, CX2, CX3, EX1, EX2 and EX3. The inlets show enlarged re-plots of small regions marked by a rectangle. Table 2 and FIG. 11 very clearly show that the lattice constant of phase 2 ($LiM'O_2$) of the samples EX1, EX2 and EX3 have significantly changed, away from the value of REF2, whereas the lattice constants of phase 2 in CX2, CX3 is identical to those of REF2. The change is more pronounced with increasing sintering temperature. Increasing the sintering temperature causes the map location to move towards $LiCoO_2$, away from the expected REF2 position. This change of position on the map is typical for a solid state solution between $LiCoO_2$ and $LiM'O_2$. Obviously cobalt has diffused from the phase 1 ($LiCoO_2$) into the particles of phase 2 ($LiM'O_2$).

Surprisingly, the lattice constants of phase 1 ($LiCoO_2$) did not change during the sintering. All samples CX2, CX3 and EX1, EX2 and EX3 have lattice constants identically to those of REF1.

The Rietveld refinement also yields the fraction of phase 2 ($LiM'O_2$), which are listed in Table 2. The data show that the fraction of phase 2 increases during sintering. The fraction of $LiM'O_2$ of sample CX2 should be 40%. Obviously the Rietveld gives larger values for the $LiM'O_2$ phase. This mistake is possibly caused by a re-arrangement of small (phase 2, $LiM'O_2$) and large (phase 1, $LiCoO_2$) particles during X-ray sample preparation which might cause an enrichment of phase 1 near to the surface. The effect might be enhanced by preferred orientation of the particles of phase 1. However, neglecting this mistake we observe a clear trend. The fraction of $LiM'O_2$ increases with sintering temperature. It is indicated that during sintering more Co diffuses from phase 1 ($LiCoO_2$) into phase 2 than Ni (and Mn) diffuses from phase 2 into phase 1.

FIG. 12 shows a crystallographic map with datapoints of the samples EX4, EX5A-EX5F and CX5, together with samples REF1, REF2. The datapoints were obtained by a two-phase Rietveld refinement. The graph nicely displays that the lattice constants of phase 2 ($LiM'O_2$) of EX4, EX5A-EX5F are in-between those of $LiCoO_2$-REF1 and REF2-$LiM'O_2$. This is consistent with discussed diffusion of Co into the $2^{nd}$ phase. At the same time the lattice constants of phase 1 have not changed at all and are identical to those of REF 1-$LiCoO_2$.

FIG. 12 also compares sample CX5 with the samples EX4, EX5A-F based on their location on a crystallographic map. It can be concluded that the lattice constants of phase 2 of CX5 are identical to REF2. This is consistent with the lower sintering temperature—causing an in-sufficient cation exchange between phase 1 and phase 2.

X-Ray Diffraction Patterns

The samples REF1 and REF2 have high crystallinity, hence they show an X-ray diffraction pattern with sharp diffraction peaks. FIG. 13 shows the X-ray diffractogram (basis: scattering angle (deg)) of CX2, CX4, CX5 and EX1. All these samples have the same overall composition. The inlet of FIG. 13 shows an enlarged re-plot of the region marked by a rectangle. Sample CX2, being the mixture of (heat treated) REF1 and REF2 shows, as expected, a X-ray diffraction pattern which is the super position of the patterns of REF1 and REF2. Even if the mixture is heat treated at 900° C. (Sample CX4) or a mixture of $LiCoO_2$, mixed hydroxide and $Li_2CO_3$ (CX5), the X-ray diffraction pattern remains basically the same. This tells us that the $1^{st}$ phase $LiCoO_2$ and the 2 phase $LiM'O_2$ have not changed.

The situation, however, is very different for samples which are typical for the present invention. FIG. 13 shows that peak positions and the shape of peaks of sample EX1 has changed. The peaks of phase 1 ($LiCoO_2$ based) remain quite sharp sample and the position is identical, however peaks of phase 2 ($LiM'O_2$ based) have broadened significantly and their position has clearly moved. The main reason of this broadening is the distribution of Co and Ni stoichiometry. During sintering, Ni diffused away from the $2^{nd}$ phase, and cobalt diffuses into the $2^{nd}$ phase. As a result, different particles and/or crystallites have a different stoichiometry, each stoichiometry has its own peak position, so as a result a broader diffraction peak is observed. In a Rietveld refinement it is difficult to simulate a distribution of lattice constants. However, quite fortunately, a small crystal size causes a to some degree similar peak broadening. So a Rietveld refinement of a cathode typical of the present invention will show a large crystallite size for the first phase ($LiCoO_2$ based) and a much smaller crystallite size for the second phase ($LiM'O_2$). At the same time, the peak position of the diffraction peaks of the $2^{nd}$ phase have moved significantly towards the position of the $1^{st}$ $LiCoO_2$ phase.

FIG. 14 shows the X-ray diffractogram of samples CX6 and EX9E. These samples have the same overall composition. Sample CX6 is different from the samples described above.

The sample has been sintered too strongly. Hence the diffusion has progressed too much. As a result the $2_{nd}$ phase became similar to the $1^{st}$ phase and cannot be distinguished anymore by their X-ray pattern. All what remains is a tiny shoulder of phase 1 peaks towards low angle. Contrary to this, sample EX9E shows a small but clear peak at lower angle. A few of these peaks in FIG. 14 are marked by arrows.

Contrary to this, sample EX9E shows a small but clear peak at lower angle. Our understanding is that if Co goes into the second phase, its quantity increases, and its lattice constants 'move' towards $LiCoO_2$'s lattice constants (see above), hence the X-ray peaks move nearer, overlap and finally coincide. Therefore phase 2 in the oversintered phase possibly does not disappear, but becomes too similar to be distinguished from $LiCoO_2$.

It can be concluded that a cathode according the present invention shows an X-ray pattern which can be approximated as a $LiCoO_2$ pattern with high crystallinity, and a $LiM'O_2$ pattern with lower crystallinity. Crystallinity is still quite good for both phases. Some commercial cathode materials are less crystalline than phase 2. Also, the lattice constant of the $2^{nd}$ phase is lower than expected (the peaks are more near to the $LiCoO_2$ peaks); the expected value being the typical value of a $LiM'O_2$ phase which has been prepared from the same MOOH precursor.

Table 2 summarizes the results of the Rietveld refinement.

indicates that phase 1 is pure $LiCoO_2$. However, for sample EX1, EX2 and EX3 this plateau progressively disappears with increasing sintering temperature. Obviously, the phase 1 is not $LiCoO_2$ anymore. This is consistent with the fact that particles of phase 1 contain Ni and Mn, as the EDS analysis clearly showed. However, very surprisingly, phase 1 has exactly the X-ray diffraction pattern of $LiCoO_2$, with lattice constants very different from the values which are expected for Ni—Mn doped $LiCoO_2$.

Rate Performance and Cycling Stability

Table 3 lists the results obtained from coin cell testing of the references REF1 and REF2 as well as of the samples CX2, CX3, EX1, EX2 and EX3 and a calculated value for the hypothetical sample CC1. All samples have the same overall composition. The table gives averaged data for 2 coin cells of each sample.

We observe that the sample CX2 (mixture of heated $LiCoO_2$ and $LiM'O_2$) has properties which are very similar to those of the hypothetical sample. Clearly—mixing of $LiCoO_2$ and $LiM'O_2$ does not give any benefit. Sample CX3 and CX4 (heated mixture of $LiCoO_2$ and $LiM'O_2$) has slightly better rate performance and slightly improved cycling stability but generally the properties are not very different from sample CX2 or CC1.

However, samples EX1, EX2 and EX3 show a significantly improved rate performance. At 1C, 2C, 3C approx. 95, 93 and

TABLE 2

BET surface area and crystallographic data

| Sample name | BET surface Area | Phase type 1: $LiCoO_2$ 2: $LiM'O_2$ | a hex (Å) | c hex (Å) | Volume (Å$^3$) | Mass fraction (X ray) | Size nm |
|---|---|---|---|---|---|---|---|
| REF1 | 0.17 m$^2$/g | 1 | 2.8155 | 14.0522 | 32.157 | n/a | n/a |
| REF2 | 0.41 m$^2$/g | 2 | 2.8697 | 14.2403 | 33.853 | n/a | n/a |
| CX2 | 0.25 m$^2$/g | 1 | 2.8158 | 14.0496 | 32.157 | 38.5 | 518 |
|  |  | 2 | 2.8703 | 14.2425 | 33.872 | 61.5 | 187 |
| CX3 | 0.26 m$^2$/g | 1 | 2.8156 | 14.0522 | 32.159 | 35.8 | 380 |
|  |  | 2 | 2.8700 | 14.2401 | 33.861 | 64.2 | 190 |
| CX4 | 0.25 m$^2$/g | 1 | 2.8160 | 14.0516 | 32.166 | 40.3 | 397 |
|  |  | 2 | 2.8701 | 14.2394 | 33.861 | 59.7 | 170 |
| CX5 | 0.35$^2$/g | 1 | 2.8159 | 14.0509 | 32.161 | 33.8 | 411 |
|  |  | 2 | 2.8695 | 14.2435 | 33.856 | 61.2 | 109 |
| CX6 | 0.14 m$^2$/g | 1 | 2.8160 | 14.0521 | 32.167 | 100% | 424 |
| EX1 | 0.23 m$^2$/g | 1 | 2.8159 | 14.0491 | 32.157 | 28.1 | 255 |
|  |  | 2 | 2.8563 | 14.1976 | 33.436 | 71.9 | 71 |
| EX2 | 0.25 m$^2$/g | 1 | 2.8153 | 14.0526 | 32.154 | 33.8 | 314 |
|  |  | 2 | 2.8621 | 14.2172 | 33.619 | 66.2 | 79 |
| EX3 | 0.26 m$^2$/g | 1 | 2.8153 | 14.0492 | 32.145 | 36.6 | 264 |
|  |  | 2 | 2.8604 | 14.2093 | 33.560 | 63.4 | 84 |
| EX4 | 0.17 m$^2$/g | 1 | 2.8158 | 14.0518 | 32.162 | 70.3 | 223 |
|  |  | 2 | 2.8288 | 14.1227 | 32.624 | 29.8 | 69 |
| EX5A | 0.19 m$^2$/g | 1 | 2.8165 | 14.0505 | 32.174 | 74.9 | 218 |
|  |  | 2 | 2.8301 | 14.1280 | 33.667 | 25.1 | 69 |
| EX5B | 0.21 m$^2$/g | 1 | 2.8159 | 14.0527 | 32.167 | 73.3 | 242 |
|  |  | 2 | 2.8310 | 14.1404 | 33.715 | 26.7 | 60 |
| EX5C | 0.22 m$^2$/g | 1 | 2.8161 | 14.0521 | 32.170 | 76.8 | 232 |
|  |  | 2 | 2.8341 | 14.1393 | 32.786 | 23.2 | 56 |
| EX5D | 0.23 m$^2$/g | 1 | 2.8164 | 14.0546 | 32.182 | 76.4 | 285 |
|  |  | 2 | 2.8333 | 14.1493 | 32.790 | 23.6 | 45 |
| EX5E | 0.20 m$^2$/g | 1 | 2.8167 | 14.0542 | 32.187 | 76.7 | 269 |
|  |  | 2 | 2.8315 | 14.1305 | 32.704 | 23.3 | 69 |
| EX5F | 0.21 m$^2$/g | 1 | 2.8163 | 14.0531 | 32.178 | 71.8 | 389 |
|  |  | 2 | 2.8318 | 14.1280 | 32.704 | 28.2 | 56 |

Voltage Profiles

Coin cells were prepared from all reference samples REF1, REF2, from all comparative samples CX2, CX3 and from EX1, EX2 and EX3. The voltage profile of CX2, CX3 and EX1-EX3 during slow discharge is shown in FIG. 15. The samples CX2 and CX3 show a clear plateau at 3.88V. This plateau is typical for $LiCoO_2$. The presence of this plateau 91% of the capacity is obtained, compared to 91-93, 86-88 and 83-86% of the hypothetical sample CC1 or the mixture CX2, or compared to 94, 91 and 89% of the sample CX3.

We note that the improved rate performance is not related to a different morphology. All samples CX2, CX3, EX1-3 have almost identical BET surface area, and all samples are—in a general picture—a mixture of large dense irregularly shaped particles (phase 1) and agglomerated smaller particles (phase 2). Furthermore, the particle size distribution is roughly the same. Achieving an increase of rate without increasing the BET area is a very important aspect of the invention. In principle it will be possible to lower the BET surface area to meet safety and density requirements and still achieving a sufficient rate performance.

At the same time the cycling stability of EX1, EX2 and EX3 is dramatically improved. FIG. 16 displays the obtained data for sample EX1. FIG. 16a shows the calculation of the fade rate per 100 cycles (capacity vs. cycle number #), being 6.4%. The small dots represent the capacity on charging, the large dots on discharging. FIG. 16b shows the cycling stability of EX1. FIG. 16c shows the rate performance of EX1.

In FIG. 17 the cycling behavior of sample CX6 (left: A) is compared with EX5E (right: B).

TABLE 3 results of electrochemical testing. The results are the average of two coin cells.

| Sample name | $Q_{rev}$ 4.3-3 V C/10 | $Q_{irr}$ (%) | 1C/ 0.1C (%) | 2C/ 0.1C (%) | 3C/0.1C (%) | Fade rate C/10 %/100 | Fade rate C/1 %/100 |
|---|---|---|---|---|---|---|---|
| REF1 heated | 153.8 | 5.3 | 90.9 | 85.3 | 81.6 | 76 | 171 |
| REF2 | 158.2 | 3.1 | 95.6 | 93.1 | 91.0 | 40 | 110 |
| REF2 heated | 169.2 | 13.5 | 91.4 | 88.7 | 86.0 | 0.4 | 2.8 |
| CC1 | 159.4 | 8.9 | 90.9 | 86.0 | 82.9 | 47 | 107 |
| CX2 | 159.9 | 7.9 | 92.2 | 88.1 | 85.3 | 55.6 | 128 |
| CX3 | 161.7 | 7.7 | 93.8 | 90.7 | 88.5 | 31.5 | 79.3 |
| CX4 | 161.0 | 7.7 | 93.8 | 90.8 | 88.2 | 22.3 | 59.0 |
| CX5 | 157.7 | 9.5 | 92.9 | 89.8 | 87.5 | 6.6 | 18.9 |
| CX6 | 156.8 | 4.0 | 91.6 | 89.8 | 89.6 | 32.3 | 68.0 |
| EX1 | 159.6 | 6.4 | 95.0 | 92.7 | 91.1 | 5.6 | 9.5 |
| EX2 | 160.2 | 6.5 | 94.5 | 92.0 | 90.4 | 5.7 | 10.1 |
| EX3 | 159.5 | 7.4 | 94.4 | 92.0 | 90.7 | 3.4 | 6.5 |
| EX4 | 156.5 | 4.2 | 95.5 | 93.6 | 91.9 | 10.5 | 27.4 |
| EX5A | 156.9 | 3.9 | 95.4 | 93.7 | 92.5 | 8.8 | 15.2 |
| EX5B | 157.1 | 3.8 | 96.0 | 94.3 | 92.8 | 8.3 | 13.8 |
| EX5C | 157.3 | 4.3 | 95.8 | 93.7 | 91.5 | 11.1 | 24.7 |
| EX5D | 156.5 | 4.9 | 96.6 | 95.0 | 93.6 | 6.8 | 12.5 |
| EX5E | 156.5 | 4.7 | 96.7 | 95.2 | 94.2 | 5.2 | 7.0 |
| EX5F | 153.7 | 5.8 | 95.6 | 91.9 | 88.4 | 6.7 | 15.0 |

The invention claimed is:

1. A powderous lithium transition metal oxide comprising a first phase consisting of Mn and Ni bearing $LiCoO_2$ particles, said particles having a plurality of discrete and detached Mn and Ni enriched islands partially covering surfaces thereof, wherein said islands have a Mn and Ni concentration that is higher than in the bulk of said particles and said islands comprise at least 5 mol % of Mn; and
a second island-free phase having a generalized formula of $Li_{1+a}M'_{1-a}O_{2\pm b}$, with $-0.03<a<0.05$ and $b<0.02$, $M'=Ni_mMn_nCo_{1-m-n}$, with $m \geq n$, and $0.1<m+n<0.9$; wherein the first phase originates from a reaction of $LiCoO_2$ particles and the second island-free phase.

2. The powderous lithium transition metal oxide of claim 1, wherein said Mn and Ni enriched islands have a thickness of at least 100 nm and cover less than 70% of the surfaces of said Mn and Ni bearing $LiCoO_2$ particles.

3. The powderous lithium transition metal oxide of claim 1, wherein the Mn concentration in said islands is at least 4 mol % higher than the Mn concentration in the bulk of said Mn and Ni bearing $LiCoO_2$ particles.

4. The powderous lithium transition metal oxide of claim 1, wherein the Ni concentration in said Mn and Ni enriched islands is at least 2 mol % higher than the Ni concentration in the bulk of said Mn and Ni bearing $LiCoO_2$ particles.

5. The powderous lithium transition metal oxide of claim 1, having Mn and Ni bearing $LiCoO_2$ particles comprising at least 3 mol % of both Ni and Mn.

6. The powderous lithium transition metal oxide of claim 1, wherein crystallographic lattice constants a and c of said Mn and Ni bearing $LiCoO_2$ particles are respectively 2.815+/−0.002 and 14.05+/−0.01.

7. The powderous lithium transition metal oxide of claim 1, wherein the Mn and Ni bearing $LiCoO_2$ particles are monolithic and free of inner porosities.

8. The powderous lithium transition metal oxide of claim 1, wherein the size distribution of said Mn and Ni bearing $LiCoO_2$ particles has a d50 larger than 10 μm.

9. The powderous lithium transition metal oxide of claim 1, comprising between 30 wt. % and 95 wt. % of said Mn and Ni bearing $LiCoO_2$ particles.

10. The powderous lithium transition metal oxide of claim 1, having a composition of $Li_xM_yO_{2\pm\delta}$ with:
$0.97<x<1.03$, $0.97<y<1.03$, $x+y=2$;
$\delta<0.05$;
and $M=Co_{1-f-g}Ni_fMn_g$, with $0.05<f+g<0.5$ and $f>g$.

11. The powderous lithium transition metal oxide of claim 1, wherein crystallographic lattice constants a' and c' of said island-free phase have the following relationship with lattice constants a" and c" of a corresponding island-free phase of a reference lithium transition metal ($M_{ref}$) oxide, having the same composition $Li_xM_yO_{2\pm\delta}$ and consisting of pure $LiCoO_2$ particles and said corresponding island-free phase:
$0.980<a'/a''<0.998$ and $0.9860<c'/c''<0.9985$.

12. The powderous lithium transition metal oxide of claim 1, wherein said island-free phase has secondary particles having a size distribution with a d50 between 2 and 10 micrometer, said secondary particles consisting of sintered agglomerates of primary crystallites having a particle size distribution with a d50 between 0.5 and 2 μm.

13. The powderous lithium transition metal oxide of claim 1, wherein both said Mn and Ni enriched islands and said island-free phase further comprise Ti, wherein the Ti content is less than 10 mol % of M in the oxide $Li_xM_yO_{2\pm\delta}$.

14. The powderous lithium transition metal oxide of claim 10, further comprising less than 5 mol % of M of one or more dopants selected from the group consisting of Al and Mg, and less than 1 mol % of M of one or more dopants selected from the group consisting of Be, B, Ca, Zr, S, F, and P.

15. An electrochemical cell comprising a cathode comprising as an active material the powderous lithium transition metal oxide of claim 1.

16. A method for preparing the powderous lithium transition metal oxide of claim 1, comprising:
providing a mixture of $LiCoO_2$ powder or a cobalt containing precursor compound having a cobalt content of at least 90 mol %, and a Li—Ni—Mn—Co-oxide or a Ni—Mn—Co precursor powder and a Li-precursor compound; and
sintering said mixture at a temperature T of at least 910° C. for a time t between 1 and 48 hrs;
to obtain Mn and Ni bearing $LiCoO_2$ particles having Mn and Ni enriched islands partially covering surfaces thereof.

17. The method of 16, wherein the Ni—Mn—Co precursor powder is a transition metal hydroxide, oxyhydroxide, carbonate, oxycarbonate, or lithium transition metal compound, wherein the transition metal composition M" is $M''=Ni_oMn_pCo_{1-o-p}$, with $o+p>0.5$ and $o>p$.

18. The method of claim 16, wherein the Ni—Mn—Co precursor powder comprises between 5 and 70 mol % of the transition metal content of said powderous lithium transition metal oxide.

19. The method of claim 16, wherein the $LiCoO_2$ powder has a tap density of at least 2 $g/cm^3$, and consists of monolithic particles with a d50 of at least 10 μm.

20. The method of claim 16, wherein the cobalt containing precursor compound is selected from the group consisting of cobalt hydroxide, oxyhydroxide, carbonate, and mixtures thereof.

21. The method of claim 16, wherein said $LiCoO_2$ or cobalt containing precursor comprises at least 80% of the transition metal of said powderous lithium transition metal oxide, and the Ni—Mn—Co comprising precursor powder consists of particles having a particle size distribution with a d50 between 1 and 3 μm.

22. The method of claim 16, wherein said $LiCoO_2$ or cobalt containing precursor comprises less than 80% of the transition metal of said powderous lithium transition metal oxide, and the Ni—Mn—Co comprising precursor consists of particles of an agglomerated type having a particle size distribution with a d50 between 4 and 10 μm.

23. The method of claim 16, wherein the Ni—Mn—Co comprising precursor further comprises Ti, preferably in the form of $TiO_2$ particles with a d50 less than 100 nm.

\* \* \* \* \*

UNITED STATES PATENT AND TRADEMARK OFFICE
CERTIFICATE OF CORRECTION

PATENT NO. : 8,785,042 B2
APPLICATION NO. : 12/374532
DATED : July 22, 2014
INVENTOR(S) : Paulsen et al.

Page 1 of 1

It is certified that error appears in the above-identified patent and that said Letters Patent is hereby corrected as shown below:

IN THE CLAIMS:

Column 24, lines 25-26, please replace "claim 1" with --claim 10--; and

Column 24, lines 40-41, please replace "claim 1" with --claim 10--.

Signed and Sealed this
Twenty-fifth Day of November, 2014

Michelle K. Lee
*Deputy Director of the United States Patent and Trademark Office*